(12) United States Patent
Park et al.

(10) Patent No.: US 11,219,064 B2
(45) Date of Patent: Jan. 4, 2022

(54) METHOD FOR TRANSMITTING, BY BASE STATION, DOWNLINK SIGNAL IN WIRELESS COMMUNICATION SYSTEM SUPPORTING UNLICENSED BAND AND DEVICE FOR SUPPORTING SAME

(71) Applicant: LG Electronics Inc., Seoul (KR)

(72) Inventors: Hanjun Park, Seoul (KR); Seonwook Kim, Seoul (KR); Changhwan Park, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 11 days.

(21) Appl. No.: 16/635,928

(22) PCT Filed: Aug. 2, 2018

(86) PCT No.: PCT/KR2018/008786
§ 371 (c)(1),
(2) Date: Jan. 31, 2020

(87) PCT Pub. No.: WO2019/027271
PCT Pub. Date: Feb. 7, 2019

(65) Prior Publication Data
US 2020/0236709 A1  Jul. 23, 2020

Related U.S. Application Data

(60) Provisional application No. 62/540,525, filed on Aug. 2, 2017.

(51) Int. Cl.
*H04W 74/08* (2009.01)
*H04L 1/18* (2006.01)
(Continued)

(52) U.S. Cl.
CPC ....... *H04W 74/0808* (2013.01); *H04L 1/1819* (2013.01); *H04L 5/0051* (2013.01);
(Continued)

(58) Field of Classification Search
CPC ....... H04L 1/1812–1825; H04L 1/1832; H04L 1/187; H04L 47/10; H04W 74/08–0891
See application file for complete search history.

(56) References Cited

U.S. PATENT DOCUMENTS

2018/0152267 A1* 5/2018 Andreoli-Fang ... H04W 74/006
2018/0343205 A1* 11/2018 Lei ........................ H04L 1/1812
(Continued)

FOREIGN PATENT DOCUMENTS

EP         3410803         12/2018
WO    WO2016/182355    11/2016
(Continued)

OTHER PUBLICATIONS

HTC, "Discussion on CBG-based HARQ feedback multiplexing", R1-1711259, 3GPP TSG RAN WG1 NR Ad-Hoc#2, Qingdao, P.R. China dated Jun. 27-30, 2017, 3 pages.
(Continued)

*Primary Examiner* — Pao Sinkantarakorn
(74) *Attorney, Agent, or Firm* — Fish & Richardson P.C.

(57) ABSTRACT

Disclosed, in the present invention, are a method for transmitting, by a base station, a downlink signal in a wireless communication system supporting an unlicensed band, and a device for supporting the same. More particularly, in accordance with one embodiment of the present invention, when acknowledgment timing of each terminal (for example, an interval length from a time point of receiving downlink data to a time point of transmitting acknowledgment information for the downlink data) is set flexibly (or independently), a base station may determine a reference
(Continued)

downlink resource for contention window size (CWS) adjustment by considering the acknowledgement timing and perform downlink signal transmission by adjusting CWS on the basis of the acknowledgment information received for the reference downlink resource.

13 Claims, 15 Drawing Sheets

(51) Int. Cl.
  *H04L 5/00* (2006.01)
  *H04W 16/14* (2009.01)
  *H04W 74/00* (2009.01)
(52) U.S. Cl.
  CPC ......... *H04W 16/14* (2013.01); *H04W 74/006* (2013.01); *H04W 74/0866* (2013.01)

(56) References Cited

U.S. PATENT DOCUMENTS

2019/0037601 A1* 1/2019 Noh .................... H04L 27/0006
2019/0150196 A1* 5/2019 Koorapaty ............ H04L 1/1812
  370/329

FOREIGN PATENT DOCUMENTS

| WO | WO2016/182366 | 11/2016 |
| WO | WO2017/010764 | 1/2017 |

OTHER PUBLICATIONS

Huawei, HiSilicon, "Contention window size adjustment for UL category 4 LBT for eLAA", R1-164073, 3GPP TSG RAN WG1 Meeting #85 R1-164073, Nanjing, China, dated May 23-27, 2016, 4 pages.

Lenovo, "Contention window size adjustment for LBT Category 4 for LAA PDSCH transmission", R1-155815, 3GPP TSG RAN WG1 Meeting #82bis, Malmö, Sweden, dated Oct. 5-9, 2015, 5 pages.

LG Electronics, "CWS adjustment for LAA", R1-166817, 3GPP TSG RAN WG1 meeting #86, Gothenbuig, Sweden dated Aug. 22-26, 2016, 4 pages.

PCT International Search Report in International Appln No. PCT/KR2018/008786, dated Nov. 27, 2018, 4 pages.

Samsung, "Remaining issues on CWS adjustment for Cat 4 LBT", R1-166688, 3GPP TSG RAN WG1 Meeting #86, Gothenburg, Sweden dated Aug. 22-26, 2016, 3 pages.

Sharp, "Contention window size adjustment for LAA", R1-154064, 3GPP TSG RAN WG1 Meeting #82, Beijing, China, dated Aug. 24-28, 2015, 3 pages.

Extended European Search Report in European Application No. 18840412.3, dated Jun. 17, 2020, 9 pages.

Huawei, HiSilicon, "Discussion on CBG-based feedback," R1-1709969, 3GPP TSG RAN WG 1 NR Ad Hoc Meeting, Qingdao, China, dated Jun. 27-30, 2017, 3 pages, XP051299194.

LG Electronics, "Contention window size adjustment in LAA," R1-160608, 3GPP TSG RAN WG1 meeting #84, St Julian's, Malta, dated Feb. 15-19, 2016, 3 pages, XP051064246.

EP Office Action in European Appln. No. 18840412.3, dated Mar. 1, 2021, 12 pages.

Fujitsu, "Discussion on CBG based HARQ-ACK Design," R1-1707260, 3GPP TSG-RAN WG1 Meeting#89, Hangzhou, China, dated May 15-19, 2017, 9 pages.

LTE; Evolved Universal Terrestrial Radio Access (E-UTRA), "Physical layer procedures (3GPP TS 36.213 version 14.2.0 Release 14)," ETSI TS 136 213, V14.2.0, dated Apr. 2017, 456 pages.

* cited by examiner

METHOD FOR TRANSMITTING, BY BASE STATION, DOWNLINK SIGNAL IN WIRELESS COMMUNICATION SYSTEM SUPPORTING UNLICENSED BAND AND DEVICE FOR SUPPORTING SAME

CROSS-REFERENCE TO RELATED APPLICATIONS

This application is a National Stage application under 35 U.S.C. § 371 of International Application No. PCT/KR2018/008786, filed on Aug. 2, 2018, which claims the benefit of U.S. Provisional Application No. 62/540,525, filed on Aug. 2, 2017. The disclosures of the prior applications are incorporated by reference in their entirety.

TECHNICAL FIELD

The following description relates to a wireless communication system, and more particularly, to a method for transmitting, by a base station, a downlink signal in a wireless communication system supporting an unlicensed band and a device for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE

Technical Problem

An object of the present invention is to provide a method for transmitting, by a base station, a downlink signal in a wireless communication system supporting an unlicensed band and a device for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method for transmitting, by a base station, a down link signal in a wireless communication system supporting an unlicensed band, and a device supporting the same.

In another aspect of the present disclosure, a method for transmitting, by a base station, a downlink signal to a terminal in a wireless communication system supporting an unlicensed band may include determining a first transmission resource of a recent downlink trans mission burst satisfying a predetermined condition among one or more downlink transmission bursts transmitted by the base station before a first time, as a reference downlink resource, wherein the predetermined condition is related to a condition that a proportion of available acknowledgment information for each of one or more terminals for a part or entirety of the downlink transmission bursts is greater than or equal to a first value, and wherein transmission timing of the acknowledgment information for each of the one or more terminals is independently configured for each of the terminals, adjusting a contention window size (CWS) based on the acknowledgment information received from the one or more terminals with respect to the reference downlink resource by the first time, and performing downlink signal transmission through the unlicensed band based on a channel access procedure (CAP), the adjusted CWS being applied to the CAP.

Here, the first value may be preconfigured by the base station.

Here, the available acknowledgment information may be related to acknowledgment information having acknowledgment information transmission timing before the first time.

In this case, based on that the predetermined condition is related to a condition that a proportion of the transmission timing of the acknowledgment information for each of the one or more terminals for a part of the downlink transmission bursts is greater than or equal to a first value, the part of the downlink transmission bursts may be related to a first transmission resource of the downlink transmission bursts.

Based on that a proportion of non-acknowledgement (NACK) in the acknowledgment information received from the one or more terminals for the reference downlink resource by the first time is greater than or equal to a second value, the CWS may be increased. Alternatively, based on that the proportion of the NACK in the acknowledgment information received from the one or more terminals for the reference downlink resource by the first time is less than the second value, the CWS may be initialized. Here, the second value may be set according to a supporting system or a supporting standard technology.

Here, the acknowledgment information may include transmission block (TB) level or code block group (CBG) level acknowledgment information.

As an example, based on that the acknowledgment information may include the CB G level acknowledgment information, the proportion of the NACK in the acknowledgment information received from the one or more terminals for the reference downlink resource by the first time may be calculated in consideration of acknowledgment information for all CB Gs included in the CBG level acknowledgment information.

Alternatively, based on that the acknowledgment information may include the CBG level acknowledgment information, the proportion of the NACK in the acknowledgment information received from the one or more terminals for the reference downlink resource by the first time may be calculated considering only acknowledgment information for a part of CBGs included in the CBG level acknowledgment information In this case, the acknowledgment information for the part of CBGs may be determined based on a transmission time order or a CBG index order of CBGs transmitted in the reference downlink resource.

Based on transmitting, by the base station, a signal based on a plurality of transmission beams, the reference downlink resource may be determined for each of the beams.

In another aspect of the present disclosure, a base station for transmitting a downlink signal in a wireless communication system supporting an unlicensed band, the base station may include a receiver, a transmitter, and a processor operatively connected with the receiver and the transmitter, wherein the processor is configured to determine a first transmission resource of a recent downlink transmission burst satisfying a predetermined condition among one or more downlink transmission bursts transmitted by the base station before a first time, as a reference downlink resource, wherein the predetermined condition is related to a condition that a proportion of available acknowledgment information for each of one or more terminals for a part or entirety of the downlink transmission bursts is greater than or equal to a first value, and wherein transmission timing the acknowledgment information for each of the one or more terminals is independently configured for each of the terminals, to adjust a contention window size (CWS) based on the acknowledgment information received from the one or more terminals with respect to the reference downlink resource by the first time, and to perform downlink signal transmission through the unlicensed band based on a channel access procedure (CAP), the adjusted CWS being applied to the CAP.

The above-described aspects of the present disclosure are merely some of the examples of the present disclosure, and various examples reflecting the technical features of the present disclosure will be described below may be derived and understood by those skilled in the art. based on the detailed description of the disclosure.

Advantageous Effects

According to examples of the present disclosure, the following effects may be obtained.

According to the present disclosure, a base station may adjust a contention window size (CWS) for signal transmission in an unlicensed band in consideration of transmission timing of acknowledgment information that is independently configured (or dynamically configured) for each terminal.

In addition, when the base station receives acknowledgment information of a code block group (CBG) level from one or more terminals, the base station may efficiently adjust the CWS according to the information.

Effects obtainable in the examples of the present disclosure are not limited to the above-mentioned effects, and other effects not mentioned above may be clearly derived and understood by those skilled in the art from the following detailed description of the examples of the present disclosure. In other words, unintended effects of the present disclosure may also be derived by those skilled in the art from the examples of the present disclosure.

DESCRIPTION OF DRAWINGS

The accompanying drawings, which are included to provide a further understanding of the disclosure, provide examples of the present disclosure together with detail explanation. Yet, a technical characteristic of the present disclosure is not limited to a specific drawing. Characteristics disclosed in each of the drawings are combined with each other to configure a new example. Reference numerals in each drawing correspond to structural elements.

BEST MODE

Figure 1:
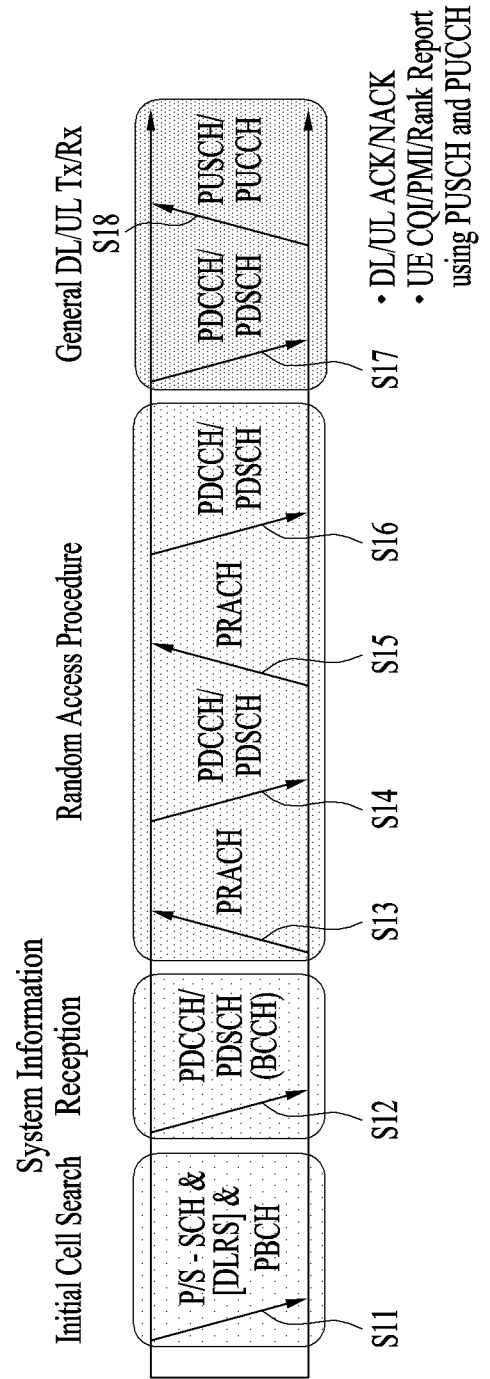
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

While the embodiments of the present disclosure are described based on the 3GPP NR system as well as the 3GPP/LTE-A system to clarify the technical features of the present disclosure, the present disclosure is also applicable to the IEEE 802.16e/m system, etc.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
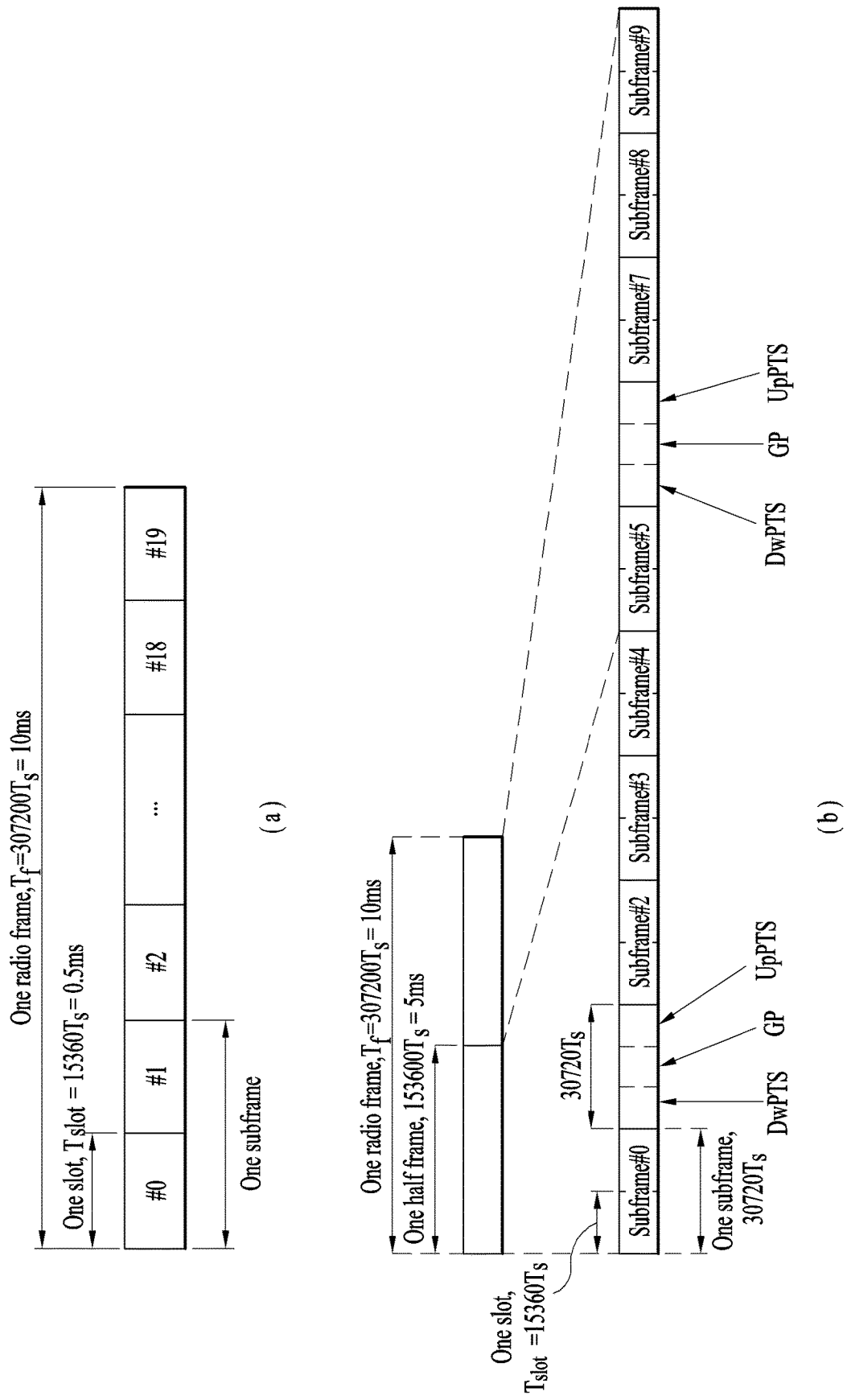
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360.Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_S$ | 2192 · $T_S$ | 2560 · $T_S$ | 7680 · $T_S$ | 2192 · $T_S$ | 2560 · $T_S$ |
| 1 | 19760 · $T_S$ | | | 20480 · $T_S$ | | |
| 2 | 21952 · $T_S$ | | | 23040 · $T_S$ | | |
| 3 | 24144 · $T_S$ | | | 25600 · $T_S$ | | |
| 4 | 26336 · $T_S$ | | | 7680 · $T_S$ | 4384 · $T_S$ | 5120 · $T_S$ |
| 5 | 6592 · $T_S$ | 4384 · $T_S$ | 5120 · $T_S$ | 20480 · $T_S$ | | |
| 6 | 19760 · $T_S$ | | | 23040 · $T_S$ | | |
| 7 | 21952 · $T_S$ | | | 12800 · $T_S$ | | |
| 8 | 24144 · $T_S$ | | | — | — | — |
| 9 | 13168 · $T_S$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations (3, 4, 7, 8) for normal cyclic prefix in downlink and special subframe configurations (2, 3, 5, 6) for extended cyclic prefix in downlink and 4 additional UpPTS SC-FDMA symbols for special subframe configurations (1, 2, 3, 4, 6, 7, 8) for normal cyclic prefix in downlink and special subframe configurations (1, 2, 3, 5, 6) for extended cyclic prefix in downlink.)

the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 2

| | | Normal cyclic prefix in downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_S$ | $(1 + X) \cdot 2192 \cdot T_S$ | $(1 + X) \cdot 2560 \cdot T_S$ | $7680 \cdot T_S$ | $(1 + X) \cdot 2192 \cdot T_S$ | $(1 + X) \cdot 2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | $(2 + X) \cdot 2192 \cdot T_S$ | $(2 + X) \cdot 2560 \cdot T_S$ |
| 5 | $6592 \cdot T_S$ | $(2 + X) \cdot 2192 \cdot T_S$ | $(2 + X) \cdot 2560 \cdot T_S$ | $20480 \cdot T_S$ | | |
| 6 | $19760 \cdot T_S$ | | | $23040 \cdot T_S$ | | |
| 7 | $21952 \cdot T_S$ | | | $12800 \cdot T_S$ | | |
| 8 | $24144 \cdot T_S$ | | | — | — | — |
| 9 | $13168 \cdot T_S$ | | | — | — | — |
| 10 | $13168 \cdot T_S$ | $13152 \cdot T_S$ | $12800 \cdot T_S$ | — | — | — |

Figure 3:
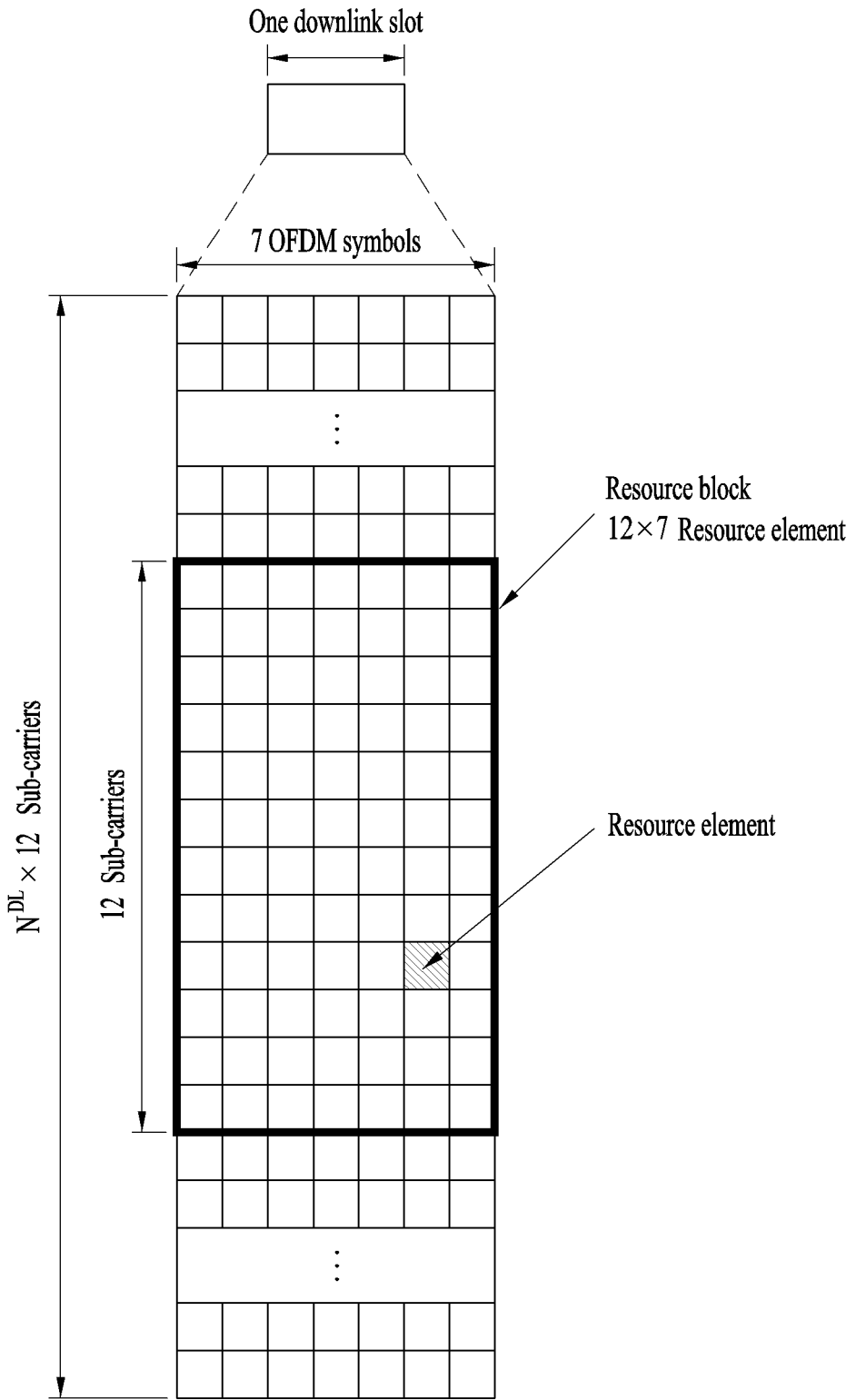
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
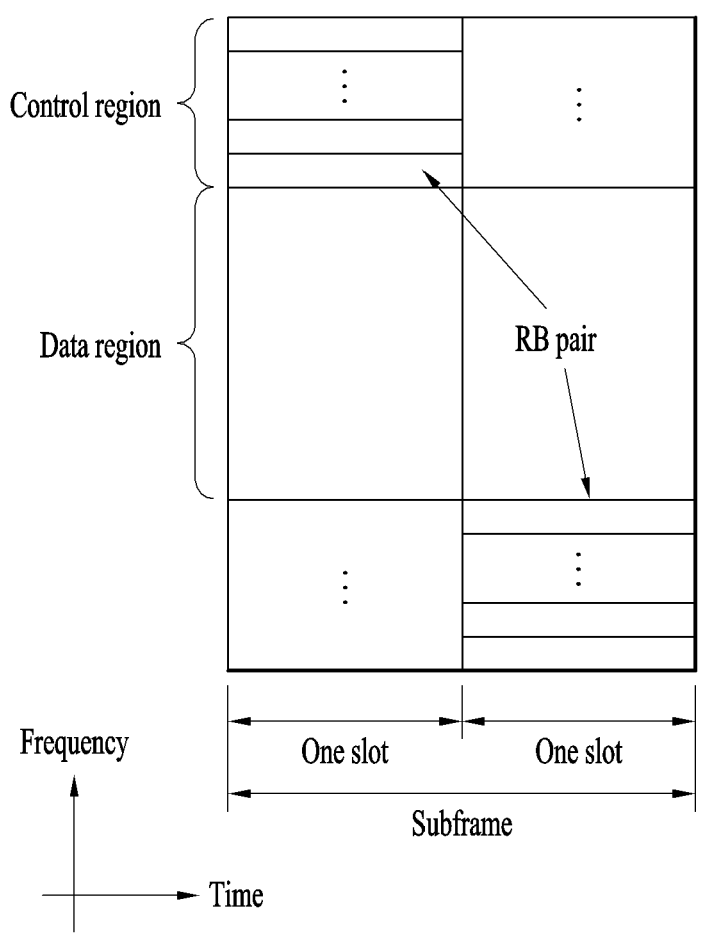
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus, it is said that the RB pair frequency-hops over a slot boundary.

Figure 5:
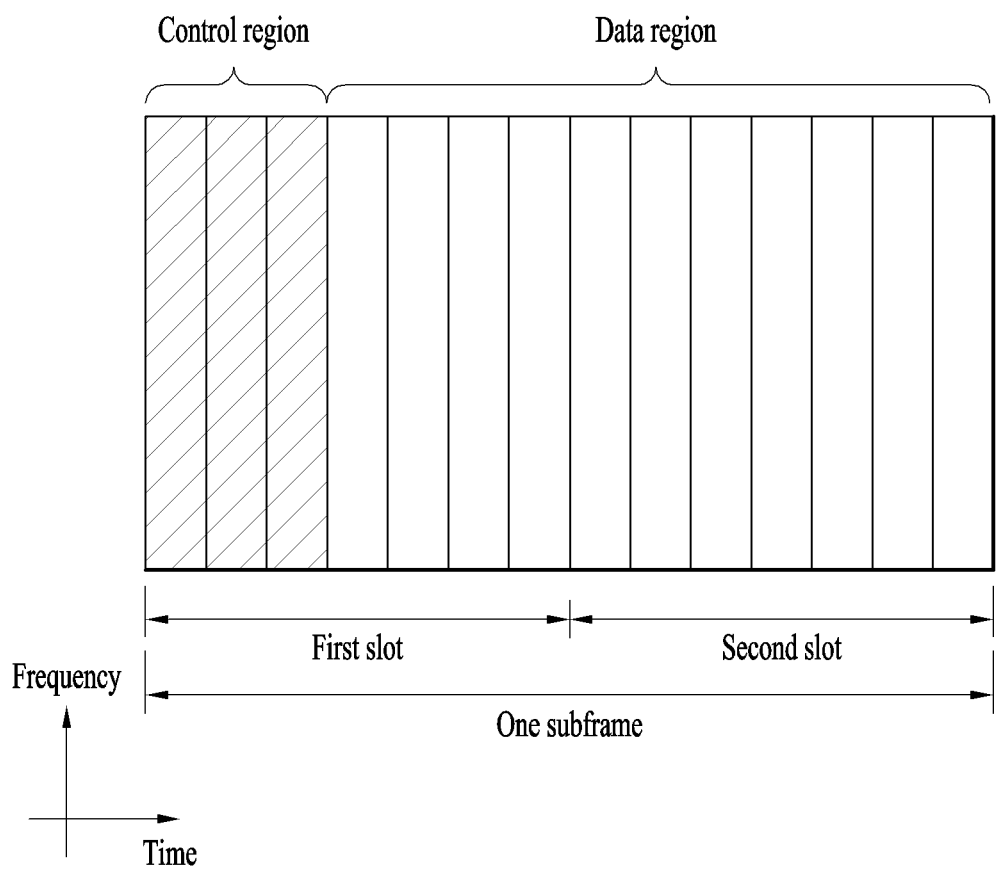
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and 2. New Radio Access Technology System As a number of communication devices have required higher communication capacity, the necessity for the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present disclosure, the corresponding technology is referred to as the new RAT or new radio (NR) for convenience of description.

2.1. Numerologies

The NR system to which the present disclosure is applicable supports various OFDM numerologies shown in the following table. In this case, the value of µ and cyclic prefix information per carrier bandwidth part may be signaled in DL and UL, respectively. For example, the value of µ and cyclic prefix information per downlink carrier bandwidth part may be signaled though DL-BWP-mu and DL-MWP-cp corresponding to higher layer signaling. As another example, the value of µ and cyclic prefix information per uplink carrier bandwidth part may be signaled though UL-BWP-mu and UL-MWP-cp corresponding to higher layer signaling.

TABLE 3

| μ | Δf = $2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe, \mu} = N_{symb}^{slot} N_{slot}^{subframe, \mu}$.

In addition, each subframe may be composed of two half-frames with the same size. In this case, the two half-frames are composed of subframes 0 to 4 and subframes 5 to 9, respectively.

Regarding the subcarrier spacing p, slots may be numbered within one subframe in ascending order like $n_s^\mu \in \{0, \ldots, N_{slot}^{subframe, \mu} - 1\}$ and may also be numbered within a frame in ascending order like $n_s^\mu \in \{0, \ldots, N_{slot}^{frame, \mu} - 1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| μ | $N_{symb}^{slot}$ | $N_{slot}^{frame, \mu}$ | $N_{slot}^{subframe, \mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame, \mu}$ | $N_{slot}^{subframe, \mu}$ |
| --- | --- | --- | --- |
| 2 | 12 | 40 | 4 |

In the NR system to which the present disclosure is applicable, a self-contained slot structure may be applied based on the above-described slot structure.

Figure 6:
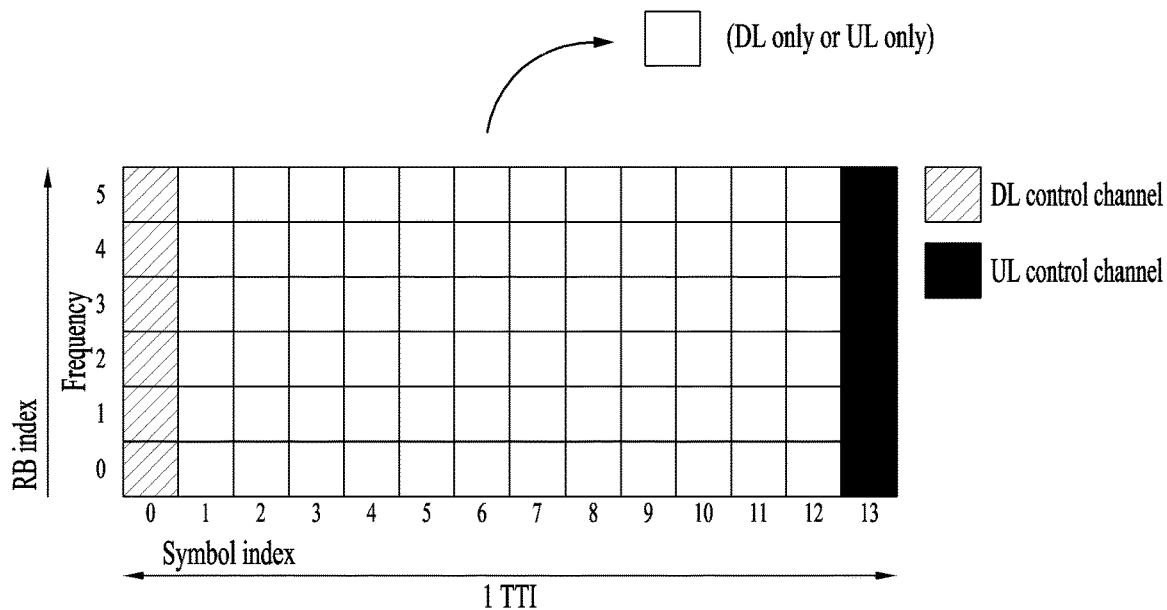
FIG. 6 is a diagram illustrating a self-contained subframe structure applicable to the present disclosure.

FIG. 6 is a diagram illustrating a self-contained slot structure applicable to the present disclosure.

In FIG. 6, the hatched area (e.g., symbol index=0) indicates a downlink control region, and the black area (e.g., symbol index=13) indicates an uplink control region. The remaining area (e.g., symbol index=1 to 13) may be used for DL or UL data transmission.

Based on this structure, the eNB and UE may sequentially perform DL transmission and UL transmission in one slot. That is, the eNB and UE may transmit and receive not only DL data but also UL ACK/NACK in response to the DL data in one slot.

Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions may be selectively included in the self-contained slot structure. In other words, the self-contained slot structure according to the present disclosure may include either the DL control region or the UL control region as well as both the DL and UL control regions as shown in FIG. 6.

In addition, for example, the slot may have various slot formats. In this case, OFDM symbols in each slot may be divided into downlink symbols (denoted by 'D'), flexible symbols (denoted by 'X'), and uplink symbols (denoted by 'U').

Thus, the UE may assume that DL transmission occurs only in symbols denoted by 'D' and 'X' in the DL slot. Similarly, the UE may assume that UL transmission occurs only in symbols denoted by 'U' and 'X' in the UL slot.

2.3. Analog Beamforming

In a millimeter wave (mmW) system, since a wavelength is short, a plurality of antenna elements may be installed in the same area. That is, considering that the wavelength at 30 GHz band is 1 cm, a total of 100 antenna elements may be installed in a 5*5 cm panel at intervals of 0.5 lambda (wavelength) in the case of a 2-dimensional array.

Therefore, in the mmW system, it is possible to improve the coverage or throughput by increasing the beamforming (BF) gain using multiple antenna elements.

In this case, each antenna element may include a transceiver unit (TXRU) to enable adjustment of transmit power and phase per antenna element. By doing so, each antenna element may perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

Figure 7:
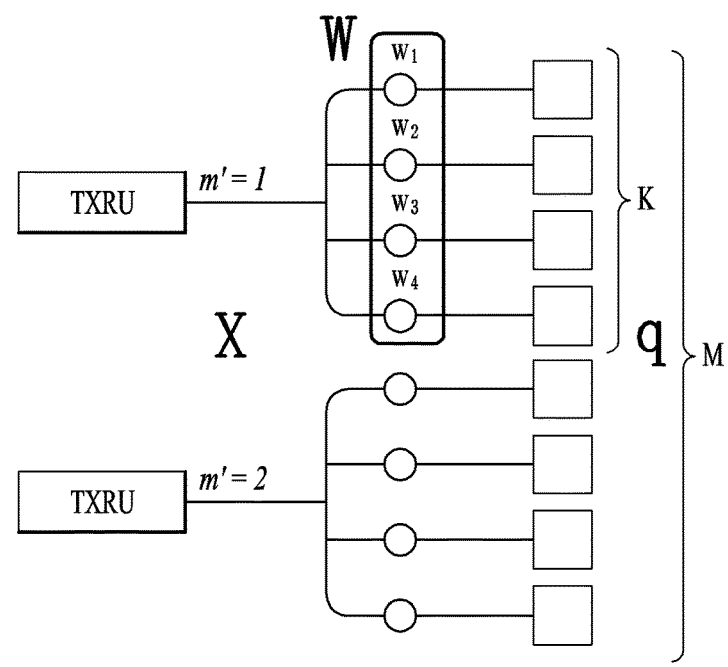
FIGS. 7 and 8 are diagrams illustrating representative connection methods for connecting TXRUs to antenna elements.
Figure 8:
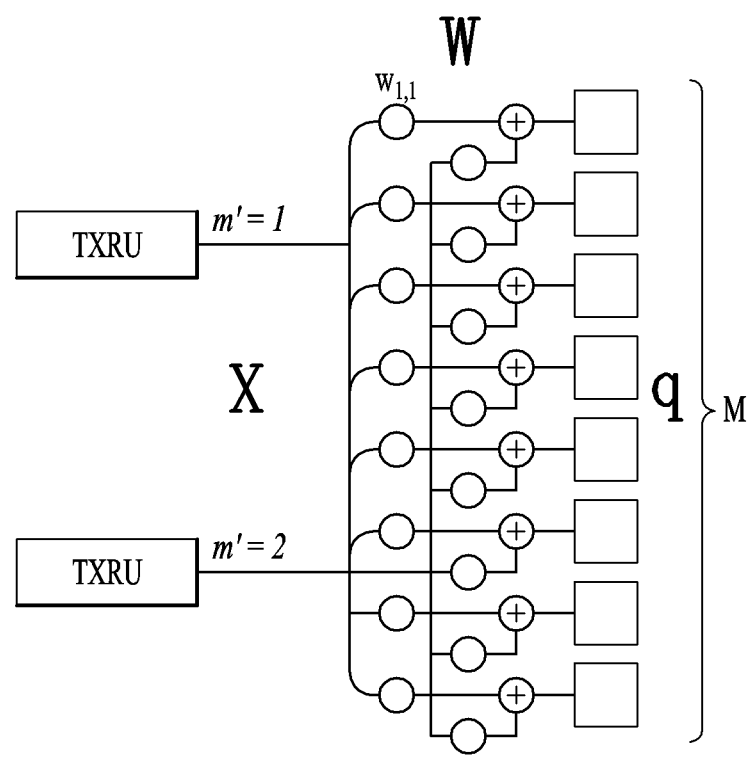

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas may be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present disclosure is applicable, the hybrid beamforming method obtained by combining the digital beamforming and analog beamforming may be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
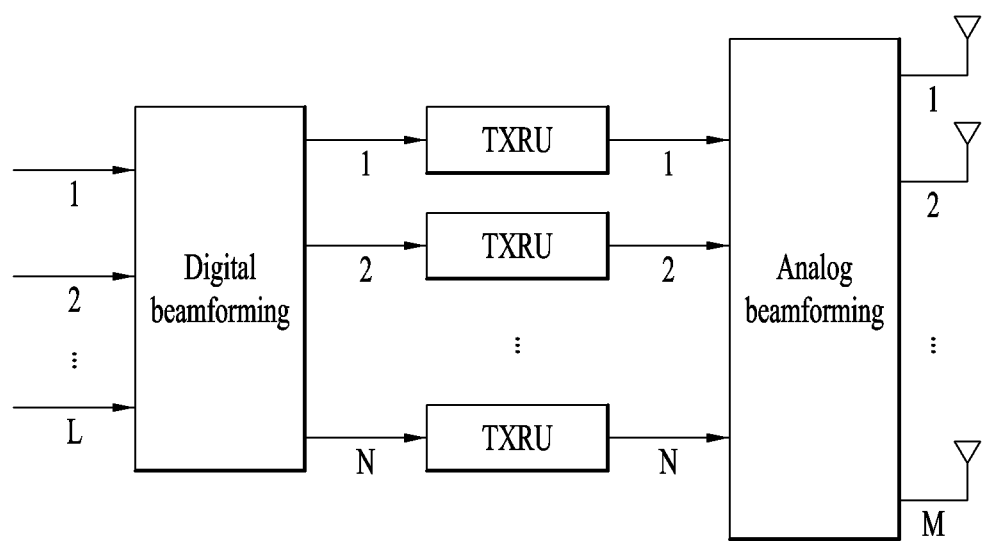
FIG. 9 is a schematic diagram illustrating a hybrid beamforming structure according to an example of the present disclosure in terms of TXRUs and physical antennas.

FIG. 9 is a schematic diagram illustrating a hybrid beamforming structure according to an embodiment of the present disclosure in terms of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present disclosure is applicable.

Further, a method of introducing a plurality of antenna panels where independent hybrid beamforming may be applied by defining N TXRUs and M RF antennas as one antenna panel has also been considered in the NR system to which the present disclosure is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present disclosure is applicable.

Figure 10:
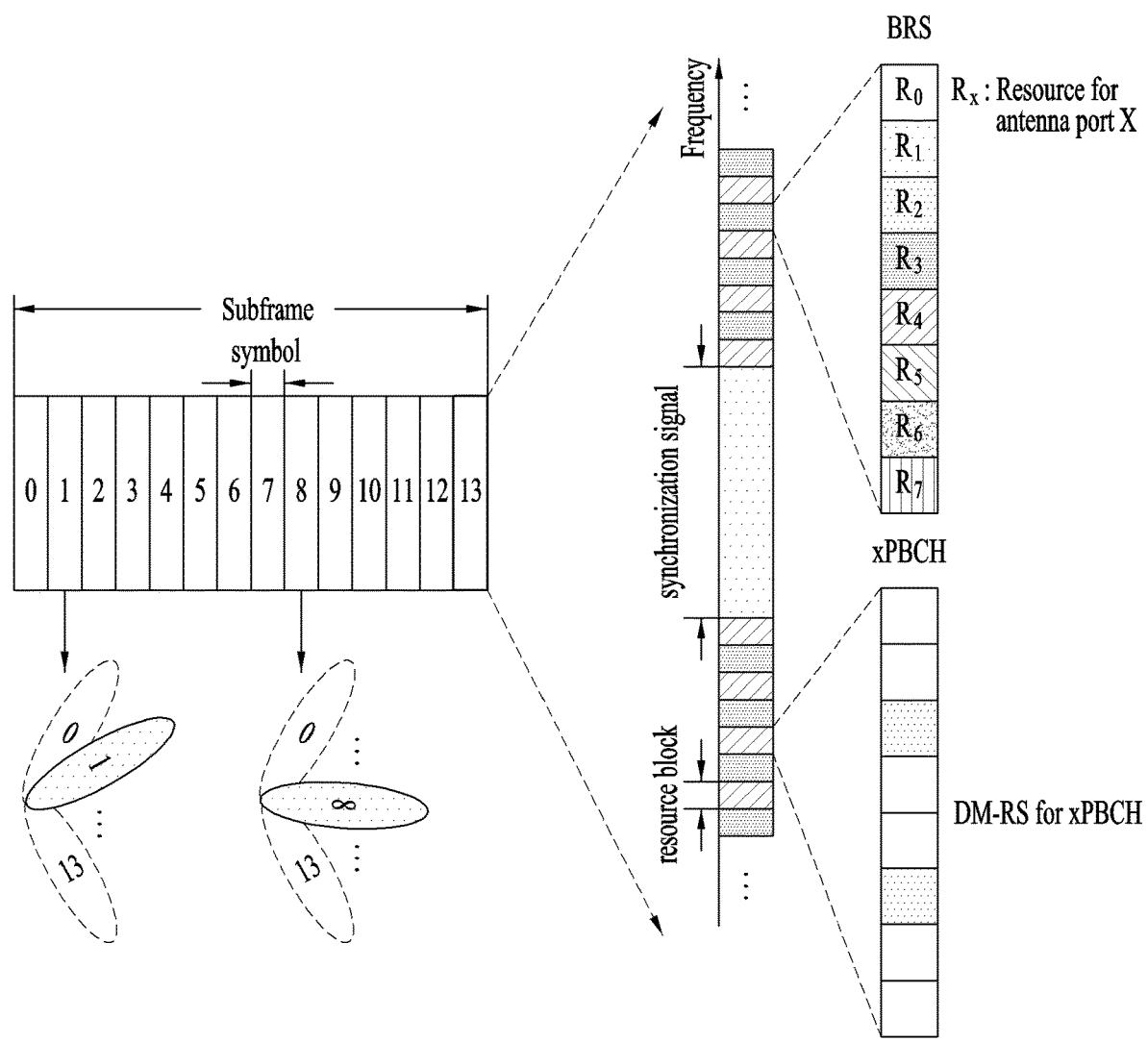
FIG. 10 is a diagram schematically illustrating the beam sweeping operation for synchronization signals and system information during a downlink (DL) transmission process according to an example of the present disclosure.

FIG. 10 is a diagram schematically illustrating the beam sweeping operation for synchronization signals and system information during a downlink (DL) transmission process according to an embodiment of the present disclosure In FIG. 10, a physical resource (or channel) for transmitting system information of the NR system to which the present disclosure is applicable in a broadcasting manner is referred to as a physical broadcast channel (xPBCH). In this case, analog beams belonging to different antenna panels may be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present disclosure is applicable. The BRS may be defined for a plurality of antenna ports, and each BRS antenna port may correspond to a single analog beam. In this case, in contrast to the BRS, all analog beams in the analog beam group may be applied to the synchronization signal or xPBCH to assist a random UE to correctly receive the synchronization signal or xPBCH.

3. Licensed Assisted Access (LAA) System

Hereinafter, methods for transmitting and receiving data in a carrier aggregation environment of an NR or LTE band, which is a licensed band, and a unlicensed band will be described. In the embodiments of the present disclosure, the LAA system refers to a communication system (e.g., an LTE system or an NR system) that supports a CA situation of the licensed band and the unlicensed band. Here, as the unlicensed band, a WiFi band or a Bluetooth (BT) band may be used.

Here, LAA may refer to an LTE system or an NR system operating in an unlicensed band. LAA may also refer to a method for transmitting and receiving data in the unlicensed band in combination with the licensed band.

Figure 11:
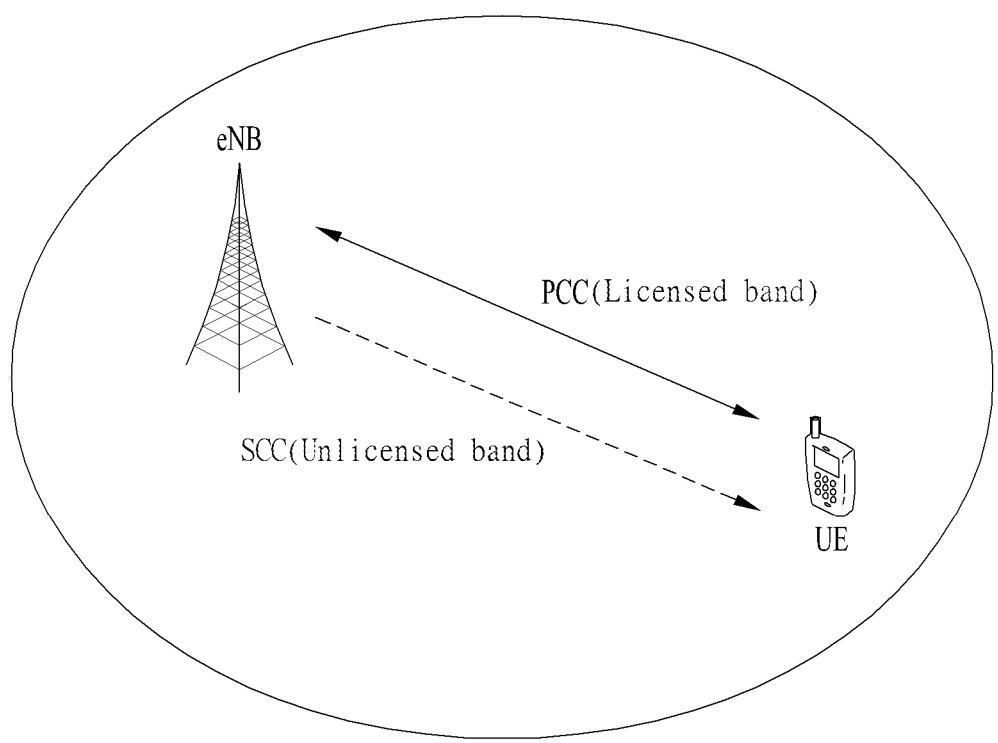
FIG. 11 is a diagram illustrating an example of a CA environment in a wireless communication system supporting an unlicensed band.

FIG. 11 is a diagram illustrating an example of a CA environment in a wireless communication system supporting an unlicensed band.

Hereinafter, for simplicity, it is assumed that the UE is configured to perform wireless communication in each of the licensed band and the unlicensed band using two component carriers (CCs). Of course, the following methods may be applied even when three or more CCs are configured for the UE.

In the embodiments of the present disclosure, it is assumed that a licensed CC (LCC) is a primary CC (which may be called a PCC or a PCell) and an unlicensed CC (UCC) is a secondary CC (which may be called a SCC or SCell). The embodiments of the present disclosure are also be applicable even to a situation in which multiple licensed bands and multiple unlicensed bands are used in a carrier aggregation manner. Further, the proposed schemes of the present disclosure are applicable not only to the 3GPP LTE system and the 3GPP NR system but also to systems having other characteristics.

FIG. 11 illustrates a case where one base station supports both the licensed band and the unlicensed band. That is, the UE may transmit/receive control information and data via a PCC, which is a licensed band, and also transmit/receive control information and data via the SCC, which is an unlicensed band. The situation shown in FIG. 11 is merely one example, and the embodiments of the present disclosure are applicable even to a CA environment where one UE accesses multiple base stations.

For example, the UE may configure a PCell with a macro base station (a Macro eNB (M-eNB) or a Macro gNB (M-gNB)), and may configure an SCell with a small base station (a Small eNB (S-eNB) or a Small gNB (S-gNB)). In this case, the macro base station and the small base station may be connected over a backhaul network.

In embodiments of the present disclosure, the unlicensed band may be operated according to a contention-based random access scheme. In this case, channel access procedures for LAA are performed as follows.

3.1. Downlink Channel Access Procedures

An eNB operating LAA Scell(s) (or an unlicensed band) shall perform the downlink channel access procedure (CAP) described below for cell(s) in which the LAA Scell(s) transmission(s) are performed.

3.1.1. Channel Access Procedure for Transmission(s) Including PDSCH/PDCCH/EPDCCH The eNB may transmit a transmission including PDSCH/PDCCH/EPDCCH on a carrier on which LAA Scell(s) transmission(s) are performed, after first sensing the channel to be idle during the slot durations of a defer durationTd; and after the counter N is zero in step 4 below. The counter N is adjusted by sensing the channel for additional slot duration(s) according to the steps below:

1) set N=Ninit, where Ninit is a random number uniformly distributed between 0 and CWp, and go to step 4;
2) if N>0 and the eNB chooses to decrement the counter, set N=N−1;
3) sense the channel for an additional slot duration, and if the additional slot duration is idle, go to step 4; else, go to step 5;
4) if N=0, stop; else, go to step 2;
5) sense the channel until a busy slot is detected in an additional defer duration Td or all the slots of the additional defer duration Td are detected to be idle;
6) if the channel is sensed to be idle during all the slot durations of the additional defer duration Td, go to step 4; else, go to step 5.

The CAP for transmission including PDSCH/PDCCH/EPDCCH of the eNB described above may be summarized as follows.

Figure 12:
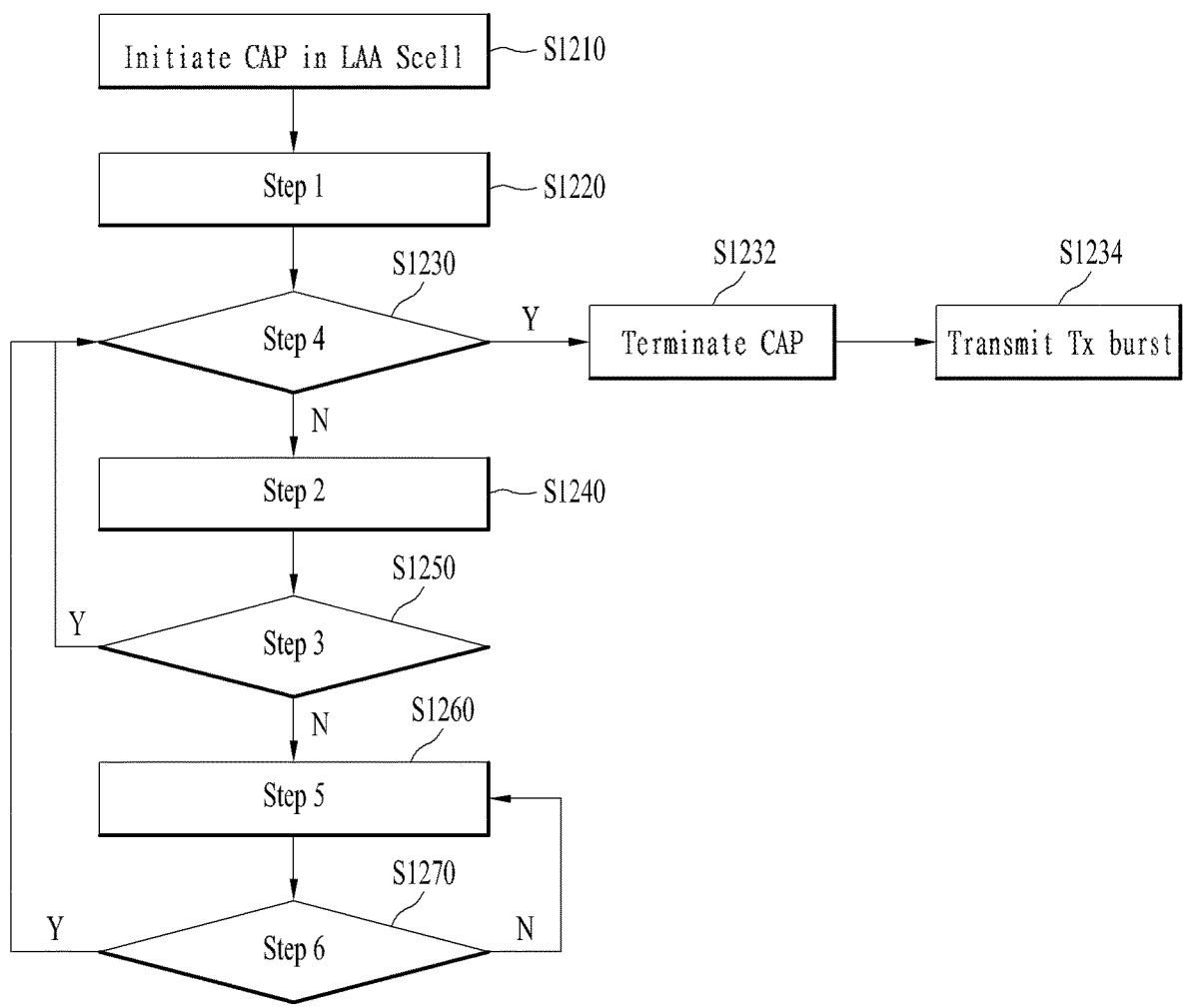
FIG. 12 is a diagram illustrating a CAP for unlicensed band transmission applicable to the present disclosure.

FIG. 12 is a diagram illustrating a CAP for unlicensed band transmission applicable to the present disclosure.

For a downlink transmission, a transmission node (e.g., an eNB) may initiate a channel access procedure (CAP) to operate in the LAA Scell(s), which are unlicensed band cells (S1210).

The eNB may randomly select a backoff counter N within the contention window CW according to step 1. At this time, N is set to an initial value Ninit (S1220). Ninit is selected as any value from among the values between 0 and CWp.

Next, if the backoff counter value N is 0 in step 4 (S1230; Y), the eNB terminates the CAP (S1232). Then, the eNB may perform Tx burst transmission including PDSCH/PDCCH/EPDCCH (S1234). On the other hand, if the backoff counter value is not 0 (S1230; N), the eNB decrements the backoff counter value by 1 according to step 2 (S1240).

Then, the eNB checks whether the channel of the LAA SCell(s) is idle (S1250). If the channel is idle (S1250; Y), the base station checks whether the backoff counter value is 0 (S1230).

On the contrary, if the channel is not idle in operation S1250 (S1250; N), namely, if the channel is busy, the eNB checks whether the channel is idle during a defer duration Td (25 usec or more) longer than the slot time (e.g., 9 usec) (S1262). If the channel is idle during the defer duration (S1270; Y), the eNB may resume the CAP.

For example, when the backoff counter value Ninit is 10 and it is determined that the channel is busy after the backoff counter value is decreased to 5, the eNB senses the channel during the defer duration to determine whether the channel is idle. If the channel is idle during the defer duration, the eNB may perform the CAP again from the backoff counter value 5 (or 4 after decrementing the backoff counter value by 1) instead of setting the backoff counter value Ninit.

On the other hand, if the channel is busy during the defer duration (S1270; N), the eNB re-performs operation S1260 and checks again whether the channel is idle during a new defer duration.

If an eNB has not transmitted a transmission including PDSCH/PDCCH/EPDCCH on a carrier on which LAA Scell(s) transmission(s) are performed after step 4 in the procedure above, the eNB may transmit a transmission including PDSCH/PDCCH/EPDCCH on the carrier if the following conditions are met:

the channel is sensed to be idle at least in a slot duration Tsl when the eNB is ready to transmit PDSCH/PDCCH/EPDCCH; and the channel has been sensed to be idle during all the slot durations of a defer duration Td immediately before this transmission.

If the channel has not been sensed to be idle in a slot duration Tsl when the eNB senses the channel after it is ready to transmit, or if the channel has been sensed to be not idle during any of the slot durations of a defer duration Td immediately before the intended transmission, the eNB proceeds to step 1 after sensing the channel to be idle during the slot durations of a defer duration Td.

The defer duration Td consists of duration Tf (=16 us) immediately followed by $m_p$ consecutive slot durations where each slot duration Tsl is 9 us, and Tf includes an idle slot duration Tsl at the start of Tf.

A slot duration Tsl is considered to be idle if the eNB senses the channel during the slot duration Tsl, and the power detected by the eNB for at least 4 us in the slot duration is less than energy detection threshold XThresh. Otherwise, the slot duration Tsl is considered to be busy.

$CW_{min,p} \leq CW_p \leq CW_{max,p}$ is the contention window. CWp adjustment is described in detail in sub clause 3.1.3.

$CW_{min,p}$ and $CW_{max,p}$ chosen before step 1 of the procedure above.

$m_p$, $CW_{min,p}$, and $CW_{max,p}$ are based on channel access priority class associated with the eNB transmission (see Table 6 below).

$X_{Thresh}$ is adjusted as described in sub clause 3.1.4.

TABLE 6

| Channel Access Priority Class (p) | $m_p$ | $CW_{min,p}$ | $CW_{max,p}$ | $T_{mcot,p}$ | allowed $CW_p$ sizes |
| --- | --- | --- | --- | --- | --- |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

If the eNB transmits discovery signal transmission(s) not including PDSCH/PDCCH/EPDCCH when N>0 in the procedure above, the eNB shall not decrement the counter N during the slot duration(s) overlapping with the discovery signal transmission.

The eNB shall not perform continuous transmission on a carrier on which the LAA Scell(s) transmission(s) are performed, for a period exceeding Tmcot,p as given in Table 6.

For p=3 and p=4 in Table 6, if the absence of any other technology sharing the carrier can be guaranteed on a long term basis (e.g., by level of regulation), Tmcot,p is set to 10 ms. Otherwise, Tmcot,p is set to 8 ms.

3.1.2. Channel Access Procedure for Transmissions Including Discovery Signal Transmission(s) and not Including PDSCH An eNB may transmit a transmission including discovery signal but not including PDSCH on a carrier on which LAA Scell(s) transmission(s) are performed immediately after sensing the channel to be idle for at least a sensing interval Tdrs=25 us and if the duration of the transmission is less than 1 ms. Here, Tdrs consists of a duration Tf (=16 us) immediately followed by one slot duration Tsl=9 us. Tf includes an idle slot duration Tsl at the start of Tf. The channel is considered to be idle for Tdrs, if it is sensed to be idle during the slot durations of Tdrs.

3.1.3. Contention Window Adjustment Procedure

If the eNB transmits transmissions including PDSCH that are associated with channel access priority class p on a carrier, the eNB maintains the contention window value CWp and adjusts CWp before step 1 of the procedure (i.e., before the CAP) described in sub clause 3.1.1 for those transmissions using the following steps:

1> for every priority class, $p \in \{1,2,3,4\}$, set $CW_p = CW_{min,p}$;

2> if at least Z=80% of HARQ-ACK values corresponding to PDSCH transmission(s) in reference subframe k are determined as NACK, increase CWp for every priority class $p \in \{1,2,3,4\}$ to the next higher allowed value and remain in step 2; otherwise, go to step 1.

In other words, if the probability that the HARQ-ACK values corresponding to the PDSCH transmission(s) in reference subframe k are determined as NACK is at least 80%, the eNB increases the CW values set for each priority class to the next higher priority class. Alternatively, the eNB maintains the CW values set for each priority class as initial values.

Here, reference subframe k is the starting subframe of the most recent transmission on the carrier made by the eNB, for which at least some HARQ-ACK feedback is expected to be available.

The eNB shall adjust the value of CWp for every priority class $p \in \{1,2,3,4\}$ based on a given reference subframe k only once.

If $CW_p = CW_{max,p}$, the next higher allowed value for adjusting CWp is $CW_{max,p}$.

The probability Z that the HARQ-ACK values corresponding to PDSCH transmission(s) in reference subframe k are determined as NACK may be determined in consideration of the followings:

- if the eNB transmission(s) for which HARQ-ACK feedback is available start in the second slot of subframe k, HARQ-ACK values corresponding to PDSCH transmission(s) in subframe k+1 are also used in addition to the HARQ-ACK values corresponding to PDSCH transmission(s) in subframe k.
- if the HARQ-ACK values correspond to PDSCH transmission(s) on an LAA SCell that are assigned by (E)PDCCH transmitted on the same LAA SCell,
- if no HARQ-ACK feedback is detected for a PDSCH transmission by the eNB, or if the eNB detects 'DTX', 'NACK/DTX' or 'any' state, it is counted as NACK.
- if the HARQ-ACK values correspond to PDSCH transmission(s) on an LAA SCell that are assigned by (E)PDCCH transmitted on another LAA cell,
- if the HARQ-ACK feedback for a PDSCH transmission is detected by the eNB, 'NACK/DTX' or 'any' state is counted as NACK, and 'DTX' state is ignored.
- if no HARQ-ACK feedback is detected for a PDSCH transmission by the eNB,
- if PUCCH format 1 with channel selection is expected to be used by the UE, 'NACK/DTX' state corresponding to 'no transmission' is counted as NACK, and 'DTX' state corresponding to 'no transmission' is ignored. Otherwise, the HARQ-ACK for the PDSCH transmission is ignored.
- if a PDSCH transmission has two codewords, the HARQ-ACK value of each codeword is considered separately.
- bundled HARQ-ACK across M subframes is considered as M HARQ-ACK responses.

If the eNB transmits transmissions including PDCCH/EPDCCH with DCI format 0A/0B/4A/4B and not including PDSCH that are associated with channel access priority class p on a channel starting from time t0, the eNB maintains the contention window value CWp and adjusts CWp before step 1 of the procedure described in sub clause 3.1.1 for those transmissions (i.e., before performing the CAP) using the following steps:

1> for every priority class $p \in \{1,2,3,4\}$, set $CW_p = CW_{min,p}$;

2> if less than 10% of the UL transport blocks scheduled by the eNB using Type 2 channel access procedure (described in sub clause 3.2.1.2) in the time interval between t0 and t0+TCO have been received successfully, increase CWp for every priority class $p \in \{1,2,3,4\}$ to the next higher allowed value and remain in step 2; otherwise, go to step 1.

Here, TCO is calculated as described is computed as described in subclause 3.2.1.

If the $CW_p = CW_{max,p}$ is consecutively used K times for generation of Ninit, CWp is reset to CWmin,p only for that priority class p for which $CW_p = CW_{max,p}$ is consecutively used K times for generation of Ninit. K is selected by the eNB from the set of values $\{1, 2, \ldots, 8\}$ for each priority class $p \in \{1,2,3,4\}$.

3.1.4. Energy Detection Threshold Adaptation Procedure

An eNB accessing a carrier on which LAA Scell(s) transmission(s) are performed, shall set the energy detection threshold (XThresh) to be less than or equal to the maximum energy detection threshold XThresh_max.

The maximum energy detection threshold XThresh_max is determined as follows:

if the absence of any other technology sharing the carrier can be guaranteed on a long term basis (e.g., by level of regulation), then:

$$X_{Thresh\_max} = \min\left\{ \begin{array}{l} T_{max} + 10 \text{ dB,} \\ X_r \end{array} \right\},$$

where Xr is the energy detection threshold defined by regulatory requirements in dBm when such requirements are defined, otherwise $X_r = T_{max} + 10$ dB.

Otherwise, $$X_{Thres\_max} = \max\left\{ \begin{array}{l} -72 + 10 \cdot \log10(BWMHz/20 \text{ MHz}) \text{ dBm,} \\ \min\left\{ \begin{array}{l} T_{max}, \\ T_{max} - T_A + (P_H + 10 \cdot \log10(BWMHz/20 \text{ MHz}) - P_{TX}) \end{array} \right\} \end{array} \right\},$$

where each variable is defined as follows:
$T_A = 10$ dB for transmission(s) including PDSCH:

$T_A$=5 dB for transmissions including discovery signal transmission(s) and not including PDSCH:

$P_H$=23 dBm $P_{TX}$ is the set maximum eNB output power in dBm for the carrier;

eNB uses the set maximum transmission power over a single carrier irrespective of whether single carrier or multi-carrier transmission is employed $T_{max}$(dBm)=10·log 10(3.16228·10$^{-8}$(mW/MHz)·BWMHz(MHz)):

BWMHz is the single carrier bandwidth in MHz.

3.1.5. Channel Access Procedure for Transmission(s) on Multiple Carriers

An eNB can access multiple carriers on which LAA Scell(s) transmission(s) are performed, according to one of the Type A or Type B procedures described below.

3.1.5.1. Type A Multi-Carrier Access Procedures

The eNB shall perform channel access on each carrier $c_i \in C$, according to the procedures described in this subclause, where C is a set of carriers on which the eNB intends to transmit, and i=0, 1 ... q−1 and q is the number of carriers on which the eNB intends to transmit.

The counter N described in subclause 3.1.1 (i.e., the counter N considered in the CAP) is determined for each carrier $c_i$ and is denoted as $N_{c_i}$. $N_{c_i}$ is maintained according to subclause 3.1.5.1.1 or 3.1.5.1.2 below.

3.1.5.1.1. Type A1

Counter N as described in subclause 3.1.1 (i.e., the counter N considered in the CAP) is independently determined for each carrier $c_i$ and is denoted as $N_{c_i}$.

If the absence of any other technology sharing the carrier can be guaranteed on a long term basis (e.g., by level of regulation), when the eNB ceases transmission on any one carrier $c_j \in C$, for each carrier ci (where $c_i \neq c_j$), the eNB can resume decrementing $N_{c_i}$ when idle slots are detected either after waiting for a duration of $4 \cdot T_{sl}$, or after reinitialising $N_{c_i}$.

3.1.5.1.2. Type A2

Counter N is determined as described in subclause 3.1.1 for each carrier $c_j \in C$, and is denoted as $N_{c_j}$, where $c_j$ may be the carrier that has the largest CWp value. For each carrier $c_i$, $N_{c_i} = N_{c_j}$.

When the eNB ceases transmission on any one carrier for which $N_{c_i}$ is determined, the eNB shall reinitialise $N_{c_i}$ for all carriers.

3.1.5.2. Type B Multi-Carrier Access Procedure

A carrier $c_j \in C$ is selected by the eNB as follows:

the eNB selects $c_j$ by uniformly randomly choosing $c_j$ from C before each transmission on multiple carriers $c_i \in C$; or the eNB selects $c_j$ no more frequently than once every 1 second, where C is a set of carriers on which the eNB intends to transmit, i=0, 1, ... q−1, and q is the number of carriers on which the eNB intends to transmit.

To transmit on carrier $c_j$, the eNB shall perform channel access on carrier $c_j$ according to the procedures described in subclause 3.1.1 with the modifications described in 3.1.5.2.1 or 3.1.5.2.2.

To transmit on carrier $c_i \neq c_j$, $c_i \in C$, for each carrier $c_i$, the eNB shall sense the carrier $c_i$ for at least a sensing interval $T_{mc}$=25 us immediately before the transmitting on carrier $c_j$. And the eNB may transmit on carrier $c_i$ immediately after sensing the carrier $c_i$ to be idle for at least the sensing interval $T_{mc}$. The carrier $c_i$ is considered to be idle for $T_{mc}$ if the channel is sensed to be idle during all the time durations in which such idle sensing is performed on the carrier $c_j$ in given interval $T_{mc}$.

The eNB shall not continuously transmit on a carrier $c_i \neq c_j$ (where $c_i \in C$) for a period exceeding Tmcot,p as given in Table 6, where the value of Tmcot,p is determined using the channel access parameters used for carrier $c_j$.

3.1.5.2.1. Type B1

A single CWp value is maintained for the set of carriers C

For determining CWp for channel access on carrier $c_j$, step 2 of the procedure described in sub clause 3.1.3 is modified as follows:

if at least Z=80% of HARQ-ACK values corresponding to PDSCH transmission(s) in reference subframe k of all carriers $c_i \in C$ are determined as NACK, increase CWp for every priority class $P \in \{1,2,3,4\}$ to the next higher allowed value; otherwise, go to step 1.

3.1.5.2.2. Type B2

A CWp value is maintained independently for each carrier $c_i \in C$ using the procedure described in subclause 3.1.3. For determining Ninit for carrier $c_j$, CWp value of carrier $c_{j1} \in C$ is used, where $c_{j1}$ is the carrier with the largest CWp among all carriers in set C.

3.2. Uplink Channel Access Procedures

A UE and an eNB scheduling UL transmission(s) for the UE shall perform the procedures described below to access the channel(s) on which the LAA Scell(s) transmission(s) are performed.

3.2.1. Channel Access Procedure for Uplink Transmission (s)

The UE can access a carrier on which LAA Scell(s) UL transmission(s) are performed according to one of Type 1 or Type 2 UL channel access procedures. Type 1 channel access procedure is described in sub clause 3.2.1.1 below. Type 2 channel access procedure is described in sub clause 3.2.1.2 below.

If an UL grant scheduling a PUSCH transmission indicates Type 1 channel access procedure, the UE shall use Type 1 channel access procedure for transmitting transmissions including the PUSCH transmission unless stated otherwise in this sub clause.

If an UL grant scheduling a PUSCH transmission indicates Type 2 channel access procedure, the UE shall use Type 2 channel access procedure for transmitting transmissions including the PUSCH transmission unless stated otherwise in this sub clause.

The UE shall use Type 1 channel access procedure for SRS (Sounding Reference Signal) transmissions not including a PUSCH transmission. UL channel access priority class p=1 is used for SRS transmissions not including a PUSCH.

TABLE 7

| Channel Access Priority Class (p) | $m_p$ | $CW_{min,p}$ | $CW_{max,p}$ | $T_{ulmcot, p}$ | allowed $CW_p$ sizes |
|---|---|---|---|---|---|
| 1 | 1 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.

NOTE2:
When $T_{ulmcot,p}$ = 6 ms it may be increased to 8 ms by inserting one or more gaps. The minimum duration of a gap shall be 100 μs. The maximum duration before including any such gap shall be 6 ms.

If the 'UL configuration for LAA' field configures an 'UL offset' 1 and an 'UL duration' d for subframe n, then the UE may use channel access Type 2 for transmissions in subframes n+l+i (where i=0, 1, . . . d−1), if the end of UE transmission occurs in or before subframe n+l+d−1.

If the UE scheduled to transmit transmissions including PUSCH in a set of subframes $n_0, n_1, \ldots, n_{w-1}$ using PDCCH DCI format 0B/4B, and if the UE cannot access the channel for a transmission in subframe $n_k$, the UE shall attempt to make a transmission in subframe $n_{k+1}$ according to the channel access type indicated in the DCI, where k∈{0, 1, . . . w−2} and w is the number of scheduled subframes indicated in the DCI.

If the UE is scheduled to transmit transmissions without gaps including PUSCH in a set of subframes $n_0, n_1, \ldots, n_{w-1}$ using one or more PDCCH DCI format 0A/0B/4A/4B and the UE performs a transmission in subframe $n_k$ after accessing the carrier according to one of Type 1 or Type 2 channel access procedures, the UE may continue transmission in subframes after $n_k$ where k∈{0, 1, . . . w−1}.

If the beginning of UE transmission in subframe n+1 immediately follows the end of UE transmission in subframe n, the UE is not expected to be indicated with different channel access types for the transmissions in those subframes.

If the UE is scheduled to perform transmission without gaps in subframes $n_0, n_1, \ldots, n_{w-1}$ using one or more PDCCH DCI format 0A/0B/4A/4B, and if the UE has stopped transmitting during or before subframe $n_{k1}$, where k1∈{0, 1, . . . w−2}, and if the channel is sensed by the UE to be continuously idle after the UE has stopped transmitting, the UE may transmit in a later subframe $n_{k2}$, where k2∈{1, . . . w−1}, using Type 2 channel access procedure. If the channel sensed by the UE is not continuously idle after the UE has stopped transmitting, the UE may transmit in a later subframe $n_{k2}$, where k2∈{1, . . . w−1}, using Type 1 channel access procedure with the UL channel access priority class indicated in the DCI corresponding to subframe $n_{k2}$.

If the UE receives an UL grant and the DCI indicates a PUSCH transmission starting in subframe n using Type 1 channel access procedure, and if the UE has an ongoing Type 1 channel access procedure before subframe n:
- if the UL channel access priority class value p1 used for the ongoing Type 1 channel access procedure is same or larger than the UL channel access priority class value p2 indicated in the DCI, the UE may transmit the PUSCH transmission in response to the UL grant by accessing the carrier by using the ongoing Type 1 channel access procedure;
- if the UL channel access priority class value p1 used for the ongoing Type 1 channel access procedure is smaller than the UL channel access priority class value p2 indicated in the DCI, the UE shall terminate the ongoing channel access procedure.

If the UE is scheduled to transmit on a set of carriers C in subframe n, and if the UL grants scheduling PUSCH transmissions on the set of carriers C indicate Type 1 channel access procedure, and if the same 'PUSCH starting position' is indicated for all carriers in the set of carriers C, and if the carrier frequencies of the set of carriers C is a subset of one of the sets of predefined carrier frequencies, the UE may transmit on carrier $c_i$∈C using Type 2 channel access procedure.

if Type 2 channel access procedure is performed on carrier $c_i$ immediately before the UE transmission on carrier $c_j$∈C, where i≠j, and if the UE has accessed carrier $c_j$ using Type 1 channel access procedure, carrier $c_j$ is selected by the UE uniformly randomly from the set of carriers C before performing Type 1 channel access procedure on any carrier in the set of carriers C.

A base station may indicate Type 2 channel access procedure in the DCI of an UL grant scheduling transmission(s) including PUSCH on a carrier in subframe n when the base station has transmitted on the carrier according to the channel access procedure described in clause 3.1.1.

Alternatively, a base station may indicate using the 'UL Configuration for LAA' field that the UE may perform a Type 2 channel access procedure for transmissions(s) including PUSCH on a carrier in subframe n when the base station has transmitted on the carrier according to the channel access procedure described in clause 3.1.1.

Alternatively, a base station may schedule transmissions including PUSCH on a carrier in subframe n, that follows a transmission by the base station on that carrier with a duration of $T_{short\_ul}=25$ us, if subframe n occurs within the time interval starting at t0 and ending at t0+TCO, where $T_{CO}=T_{m\_cot,p}+T_g$, where each variable may be defined as follows:

t0 is the time instant when the base station has started transmission;

Tmcot,p is determined by the base station as described in clause 3.1;

Tg is the total duration of all gaps of duration greater than 25 us that occur between the DL transmission of the base station and UL transmissions scheduled by the base station, and between any two UL transmissions scheduled by the base station starting from t0.

The base station shall schedule UL transmissions between to and t0+TCO in contiguous subframes if they can be scheduled contiguously.

For an UL transmission on a carrier that follows a transmission by the base station on that carrier within a duration of $T_{short\_ul}=25$ us, the UE may use Type 2 channel access procedure for the UL transmission.

If the base station indicates Type 2 channel access procedure for the UE in the DCI, the base station indicates the channel access priority class used to obtain access to the channel in the DCI.

3.2.1.1. Type 1 UL Channel Access Procedure

The UE may perform the transmission using Type 1 channel access procedure after sensing the channel to be idle during the slot durations of a defer duration Td; and after the counter N is zero in step 4. The counter N is adjusted by sensing the channel for additional slot duration(s) according to the steps described below:

1) set N=Ninit, where Ninit is a random number uniformly distributed between 0 and CWp, and go to step 4;

2) if N>0 and the UE chooses to decrement the counter, set N=N−1;

3) sense the channel for an additional slot duration, and if the additional slot duration is idle, go to step 4; else, go to step 5;

4) if N=0, stop; else, go to step 2;

5) sense the channel until either a busy slot is detected within an additional defer duration Td or all the slots of the additional defer duration Td are detected to be idle;

6) if the channel is sensed to be idle during all the slot durations of the additional defer duration Td, go to step 4; else, go to step 5.

In brief, Type 1 UL CAP of the UE described above may be summarized as follows.

For uplink transmissions, a transmission node (e.g., a UE) may initiate a channel access procedure (CAP) to operate in the LAA Scell(s), which are unlicensed band cells (S1210).

The UE may randomly select a backoff counter N within the contention window CW according to step 1. At this time, N is set to an initial value Ninit (S1220). Ninit is selected as any value among the values between 0 and CWp.

Next, if the backoff counter value N is 0 in step 4 (S1230; Y), the UE terminates the CAP (S1232). Then, the eNB may perform a Tx burst transmission (S1234). On the other hand, if the backoff counter value is not 0 (S1230; N), the UE decrements the backoff counter value by 1 according to step 2 (S1240).

Then, the UE checks whether the channel of the LAA SCell(s) is idle (S1250). If the channel is idle (S1250; Y), the base station checks whether the backoff counter value is 0 (S1230).

On the contrary, if the channel is not idle in operation S1250 (S1250; N), namely, if the channel is busy, the UE checks whether the channel is idle during a defer duration Td (25 usec or more) longer than the slot time (e.g., 9 usec) (S1262). If the channel is idle during the defer duration (S1270; Y), the UE may resume the CAP.

For example, when the backoff counter value Ninit is 10 and it is determined that the channel is busy after the backoff counter value is decreased to 5, the UE senses the channel during the defer duration to determine whether the channel is idle. If the channel is idle during the defer duration, the UE may perform the CAP again from the backoff counter value 5 (or from 4 after decrementing the backoff counter value by 1) instead of setting the backoff counter value Ninit.

On the other hand, if the channel is busy during the defer duration (S1270; N), the UE re-performs operation S1260 and checks again whether the channel is idle for a new defer duration.

If the UE has not transmitted a transmission including PUSCH on a carrier on which LAA Scell(s) transmission(s) are performed after step 4 in the procedure above, the UE may transmit a transmission including PUSCH on the carrier if the following conditions are met:

the channel is sensed to be idle at least in a slot duration Tsl when the UE is ready to transmit the transmission including PUSCH; and the channel has been sensed to be idle during all the slot durations of a defer duration Td immediately before the transmission including PUSCH.

On the other hand, if the channel has not been sensed to be idle in a slot duration Tsl when the UE first senses the channel after it is ready to transmit, or if the channel has not been sensed to be idle during any of the slot durations of a defer duration Td immediately before the intended transmission including PUSCH, the UE proceeds to step 1 after sensing the channel to be idle during the slot durations of a defer duration Td.

The defer duration Td consists of duration Tf (=16 us) immediately followed by mp consecutive slot durations where each slot duration Tsl is 9 us, and Tf includes an idle slot duration Tsl at the start of Tf.

A slot duration Tsl is considered to be idle if the UE senses the channel during the slot duration, and the power detected by the UE for at least 4 us within the slot duration is less than energy detection threshold XThresh. Otherwise, the slot duration Tsl is considered to be busy.

$CW_{min,p} \leq CW_p \leq CW_{max,p}$ is the contention window. CWp adjustment is described in detail in sub clause 3.2.2.

$CW_{min,p}$ and $CW_{max,p}$ chosen before step 1 of the procedure above.

$m_p$, $CW_{min,p}$, and $CW_{max,p}$ are based on channel access priority class signaled to the UE (see Table 7).

$X_{Thresh}$ is adjusted as described in sub clause 3.2.3.

3.2.1.2. Type 2 UL channel access procedure

If the UL uses Type 2 channel access procedure for a transmission including PUSCH, the UE may transmit the transmission including PUSCH immediately after sensing the channel to be idle for at least a sensing interval $T_{short\_ul}$=25 us Tshort_u consists of a duration $T_f$=16 us immediately followed by one slot duration $T_{sl}$=9u and Tf includes an idle slot duration Tsl at the start of Tf. The channel is considered to be idle for Tshort_ul if it is sensed to be idle during the slot durations of Tshort_ul.

3.2.2. Contention Window Adjustment Procedure

If the UE transmits transmissions using Type 1 channel access procedure that are associated with channel access priority class p on a carrier, the UE maintains the contention window value CWp and adjusts CWp for those transmissions before step 1 of the procedure described in sub clause 3.2.1.1 (i.e., before performing the CAP), using the following procedure:

if a NDI (New Data Indicator) value for at least one HARQ process associated with HARQ_ID_ref is toggled, for every priority class p∈{1,2,3,4}, set $CW_p = CW_{min,p}$;

otherwise, increase CWp for every priority class p∈{1, 2,3,4} to the next higher allowed value.

Here, HARQ_ID_ref is the HARQ process ID of UL-SCH in reference subframe nref. The reference subframe nref is determined as follows:

If the UE receives a UL grant in subframe ng, subframe nw is the most recent subframe before subframe ng-3 in which the UE has transmitted UL-SCH using Type 1 channel access procedure:

If the UE transmits transmissions including UL-SCH without gaps starting with subframe n0 and in subframes $n_0, n_1, \ldots, n_w$, reference subframe nref is subframe n0;

otherwise, reference subframe nref is subframe nw.

The UE may keep the value of CWp unchanged for every priority class p∈{1, 2, 3,4}, if the UE scheduled to transmit transmissions without gaps including PUSCH in a set of subframes $n_0, n_1, \ldots, n_{w-1}$ using Type 1 channel access procedure, and if the UE is not able to transmit any transmission including PUSCH in the set of subframes.

The UE may keep the value of CWp for every priority class p∈{1,2,3,4} the same as that for the last scheduled transmission including PUSCH using Type 1 channel access procedure, if the reference subframe for the last scheduled transmission is also $n_{ref}$.

If $CW_p = CW_{max,p}$, the next higher allowed value for adjusting CWp is $CW_{max,p}$.

If the $CW_p = CW_{max,p}$ is consecutively used K times for generation of Ninit, CWp is reset to CWmin,p only for that priority class p for which $CW_p = CW_{max,p}$ is consecutively used K times for generation of Ninit. K is selected by the UE from the set of values {1, 2, ..., 8} for each priority class p∈{1,2,3,4}.

3.2.3. Energy Detection Threshold Adaptation Procedure

A UE accessing a carrier on which LAA Scell(s) transmission(s) are performed, shall set the energy detection threshold (XThresh) to be less than or equal to the maximum energy detection threshold XThresh_max.

The maximum energy detection threshold XThresh_max is determined as follows:

if the UE is configured with higher layer parameter 'maxEnergyDetectionThreshold-r14', XThresh_max is set equal to the value signaled by the higher layer parameter;

otherwise, the UE shall determine X'Thresh_max according to the procedure described in sub clause 3.2.3.1;

if the UE is configured with higher layer parameter 'energyDetectionThresholdOffset-r14', XThresh_max is set by adjusting X'Thresh_max according to the offset value signaled by the higher layer parameter;

otherwise, the UE shall set to $X_{Thresh\_max} = X'_{Thresh\_max}$.

3.2.3.1. Default maximum energy detection threshold computation procedure

If the higher layer parameter 'absenceOfAnyOtherTechnology-r14' indicates TRUE:

$$X'_{Thresh\_max} = \min\left\{\begin{array}{l} T_{max} + 10 \text{ dB}, \\ X_r \end{array}\right\},$$

where Xr is the maximum energy detection threshold defined by regulatory requirements in dBm when such requirements are defined, otherwise $X_r = T_{max} + 10$ dB;

otherwise, $$X'_{Thres\_max} = \max\left\{\begin{array}{l} -72 + 10 \cdot \log 10(BWMHz/20 \text{ MHz}) \text{ dBm}, \\ \min\left\{\begin{array}{l} T_{max}, \\ T_{max} - T_A + (P_H + 10 \cdot \log 10(BWMHz/20 \text{ MHz}) - P_{TX}) \end{array}\right\} \end{array}\right\},$$

where each variable is defined as follows:

$T_A = 10$ dB $P_H = 23$ dBm;

$P_{TX}$ is the set to the value of $P_{CMAX\_H,c}$ as defined in 3GPP TS 36.101.

$T_{max}$(dBm)=10·log 10(3.16228·10$^{-8}$(mW/MHz)· BWMHz (MHz))

BWMHz is the single carrier bandwidth in MHz.

3.3. Sub-Frame Structure Applicable to LAA System

Figure 13:
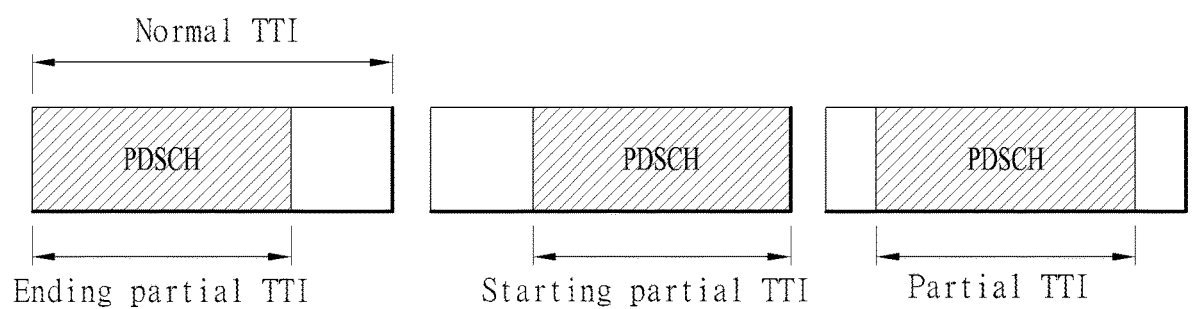
FIG. 13 is a diagram illustrating a partial TTI or a partial subframe applicable to the present disclosure.

FIG. 13 is a diagram illustrating a partial TTI or a partial subframe applicable to the present disclosure.

In the Release-13 LAA system, a partial TTI defined as DwPTS to make the most use of MCOT and support continuous transmission in transmitting a DL transmission burst is defined. The partial ITI (or partial subframe) refers to an interval in which a signal is transmitted only by a length less than the conventional TTI (e.g., 1 ms) in transmitting PDSCH.

In the present disclosure, for simplicity, a starting partial ITI or a starting partial subframe refers to a subframe in which some symbols in the head part are left blank, and an ending partial TTI or an ending partial subframe refers to a subframe in which some symbols in the tail part are left blank (whereas a complete ITI is called a normal TTI or a full TTI).

FIG. 13 is a diagram illustrating various forms of the partial TTI described above. In FIG. 13, the first block represents an ending partial TTI (or subframe), and the second block represents a starting partial TTI (or subframe). The third block of FIG. 13 represents a partial TTI (or subframe) having some symbols in the head and tail parts of a subframe left blank. Here, a time interval having no signal transmission in a normal TTI is called a transmission gap (TX gap).

While FIG. 13 is based on the DL operation, the illustrated structure also applicable to the UL operation in the same manner. For example, the partial TTI structure shown in FIG. 13 is applicable to PUCCH and/or PUSCH transmission.

4. Proposed Example

Hereinafter, a configuration proposed by the present disclosure will be described in more detail based on the technical spirit described above.

More specifically, in the present disclosure, it is assumed that, in a wireless communication system including a BS and a UE, the UE reports HARQ-ACK information for each code block group (CBG), and the BS indicates (re)transmission on a per CBG basis. In this case, as an operation for signal transmission through an unlicensed band in the system, a method of adjusting a contention window (CW) size in a random back-off-based DL LBT procedure of the BS and a UL LBT procedure of the UE will be described in detail.

With the advent of smart devices and the like, data traffic has rapidly increased, and thus utilizing an unlicensed band for cellular communication have been considered in wireless communication systems such as the 3GPP LTE-A system. For example, the Rel-13/14 LTE-A system supports a method for operating a Licensed-Assisted Access (LAA) SCell in an unlicensed band around 2.4 GHz or 5 GH, which is mainly used by a system such as the Wi-Fi system, by extending the conventional scheme of supporting carrier aggregation (CA) based on a primary cell (PCell) and a secondary cell (SCell). Here, the PCell refers to a carrier (or a cell) that provides functions such as RRC connection and re-establishment, mobility, random access, and system information, and the SCell refers to a carrier (or a cell) that mainly provides a PDSCH/PUSCH-based data transmission function.

In addition, for signal transmission for the unlicensed band, it is assumed that wireless transmission and reception are performed through competition between communication nodes. Therefore, before each communication node transmits a signal, the node is required to perform channel sensing to check that the other communication nodes do not transmit a signal. Hereinafter, for simplicity, such an operation is called a listen before talk (LBT) or a channel access procedure (CAP). In particular, the operation of checking whether the other communication nodes transmit a signal is defined as carrier sensing (CS) or clear channel assessment (CCA).

When it is determined that there is no signal transmission from other communication nodes as a result of CCA, this state is defined as a channel unoccupied (or channel idle) state. When there is a signal transmission, this state is defined as a channel occupied (or channel busy) state. For example, in the Wi-Fi standard (e.g., 801.11ac), a CCA threshold (i.e., a threshold for determining CCA) is specified as −62 dBm for non-Wi-Fi signals and −82 dBm for Wi-Fi signals. This means that a station (STA) or an access point (AP) does not perform signal translation so as not to cause interference when a signal other than Wi-Fi signals is received at power (or energy) of −62 dBm or more.

Various LBT methods may be applied for signal transmission and reception in the unlicensed band. For example, when the value of a counter called a back-off counter is configured (randomly) within a range called a CW size, the back-off counter value may be decremented by 1 each time a specific time slot is determined to be channel idle according to CCA performed in a plurality of time slots. Then, when the back-off counter value becomes 0, back-off based LBT that allows signal transmission the off counter value may be applied as an LBT method for signal transmission and reception in the unlicensed band.

In the Rel-13 LTE system, a random back-off based LBT scheme, which is named Category 4 (hereinafter, Cat. 4), is supported as a DL LBT operation in the LAA system. Here, LBT parameters for Cat. 4 DL LBT includes a defer period length, a CW size, a maximum channel occupancy time (MCOT) value, and a (corresponding) traffic types for each of four channel access priority classes.

Accordingly, the BS may perform random back-off using the LBT parameters determined according to the channel access priority class. Upon accessing a channel after finishing the random back-off, the BS may perform DL signal transmission within the MCOT.

In the DL LBT procedure of the BS, the CW size may be adjusted. In the Rel-13/14 LTE system, the first subframe (SF) in the latest DL TX burst (i.e., a series of DL transmissions) for which HARQ-ACK is available is taken as a reference SF, and a configuration for adjusting the CW size is supported based on the HARQ-ACK result in the reference SF. According to this, when 80% or more of the HARQ-ACK is NACK as a result of decoding for the first SF in the latest DL TX burst transmitted by the BS, the BS determines that a signal collision has occurred, and increases the CW size to the next largest CW size after the currently applied CW size in a pre-agreed CW size set. Alternatively, when less than 80% of the HARQ-ACK is NACK as a result of decoding for the first SF in the latest DL TX burst transmitted by the BS, the BS may determine that there is no signal collision, and initialize the CW size to the minimum value (e.g., CWmin).

This operation is based on the assumption that the BS transmits a TX burst after successfully performing the LBT operation, and occurrence of NACK (corresponding to a certain percentage or higher) in the first SF transmitted may be determined as a case where the CW is not sufficient and different nodes perform retransmission simultaneously.

Similarly, in the Rel-13 LTE system, as a UL LBT operation in the LAA system, single CCA slot-based LBT (referred to as one-shot LBT) in which sensing is performed only in a 25 us-long CCA slot and UL signal (e.g., PUSCH) transmission is performed) and Category 4 LBT (hereinafter referred to as Cat. 4 LBT) that utilizes LBT parameters defined in four LBT priority classes as shown in Table 7 above are supported. Table 7 shows a defer period length, minimum/maximum CW sizes, and a maximum channel occupancy time (MCOT), and a set of CW size for each LBT priority class in the respective columns.

In the LAA UL system, there is not a separate channel such as PHICH for informing the UE of HARQ-ACK information for the PUSCH due to introduction of an asynchronous HARQ procedure. As a result, it is difficult to utilize the correct HARQ-ACK information in adjusting the CW size in the UL LBT procedure. Accordingly, in the UL LBT procedure, when the UE receives the UL grant in the n-th SF, the UE configures the first SF of the latest UL TX burst before the (n−3)-th SF as a reference SF and supports the operation of adjusting the CW size based on a new data indicator (NDI) for a HARQ process ID corresponding to the reference SF.

That is, when the BS toggles one or more NDIs (for each TB) (or when retransmission is indicated for one or more TBs), the UE may assume that transmission of PUSCH has failed due to collision with another signal in a reference SF, and thus increase the CW size to the next largest CW size after the currently applied CW size in a pre-agreed set of CW sizes. Alternatively, when the BS does not toggle one or more NDIs (for each TB) (or retransmission is not indicated for the TB), the UE may initialize the CW size to the minimum value (e.g. CWmin), assuming that the PUSCH has been successfully transmitted (without collision with another signal) in the reference SF.

The NR system, which is a part of the 5G wireless communication system discussed by the 3GPP standardization organization, is designed to support multiple logical networks in a single physical system and to support services (e.g., enhanced Mobile Broadband (eMBB), massive Machine Type Communication (mMTC), Ultra Reliability Low Latency Communication (URLLC), etc.) that have multiple requirements.

In addition, in transmitting a transport block (TB) on a physical data shared channel (PDSCH), which is a physical channel for data transmission, the NR system according to the present disclosure may support an operation of dividing one TB into a plurality of code blocks (CBs), configuring a code block group (CBG) by bundling one or more CBs, and performing HARQ-ACK transmission on a per CBG basis and/or (re)transmission on a per CBG basis. As an example, when the BS transmits a TB in the initial transmission, and then the UE reports HARQ-ACK information for each CBG to the BS, the BS may bundle and retransmit only some CBGs whose HARQ-ACK reported by the UE is NACK.

In addition, in the NR system according to the present disclosure, HARQ-ACK transmission timing (hereinafter, referred to as HARQ-ACK timing) with respect to PDSCH reception timing may be indicated to the UE through downlink control information (DCI), which is a physical layer control signal. As an example, the BS may pre-configure a plurality of HARQ-ACK timing values for the UE through higher layer signaling such as RRC signaling, and schedule the PDSCH with DL scheduling DCI. At the same time, the BS may select and indicate one of the HARQ-ACK timing values configured through the higher layer signaling as a HARQ-ACK timing value to be applied to the PDSCH through a specific Bits field in the DL scheduling DCI. Similarly, for PUSCH transmission timing (hereinafter referred to as PUSCH timing) with respect to UL grant reception timing, the BS may pre-configure a plurality of PUSCH timing values through higher layer signaling such as RRC signaling, and schedule the PUSCH with the UL grant. At the same time, the BS may select and indicate one of the PUSCH timing values configured through the higher layer signaling as a PUSCH timing value to be applied may be selected and indicated as a PUSCH timing value for transmitting the PUSCH, through a specific Bits field in the UL grant.

Hereinafter, the present disclosure proposes a method for adjusting the CW size in the (random back-off based) DL LBT and UL LBT procedures for signal transmission in an unlicensed band in a wireless communication system in which the UE reports HARQ-ACK information for each code block group (CBG) and the BS indicates (re)transmission on a per CBG.

Hereinafter, for simplicity, in the present disclosure, a series of signals transmitted by a transmitting node within the maximum COT after the LBT operation is referred to as a TX burst.

For simplicity, the scheduling resource unit (for TB transmission) in the time domain is referred to as a subframe (SF) (or slot) in the present disclosure, but the scheduling resource unit may vary according to examples.

4.1. Method for CW Size Adjustment in DL LBT Procedure 4.1.1. Reference DL Resource Configuration The BS may (dynamically) indicate HARQ-ACK timing to the UE and may refer to HARQ-ACK corresponding to a specific DL transmission resource to perform CW size adjustment in the DL LBT procedure. In this case, the specific DL transmission resource (which is a HARQ-ACK reference object) (hereinafter referred to as a reference DL resource) may be configured as follows.

(1) First (transmission) SF (or slot) of the latest DL TX burst in which HARQ-ACK is available Here, availability of the HARQ-ACK may mean one of the followings.

HARQ-ACKs for all transmissions in the DL TX burst is available. Here, the HARQ-ACKs for all transmissions may be determined based on the HARQ-ACK timing actually indicated to the scheduled UEs, or max HARQ-ACK timing for all UEs connected to an unlicensed cell (U-cell).

X % or more of the HARQ-ACKs for all transmissions in the DL TX burst is available.

All HARQ-ACKs for the transmission in the first (transmission) SF (or slot) in the DL TX burst is available.

Y % or more of the HARQ-ACKs for the transmission in the first (transmission) SF (or slot) in the DL TX burst is available.

In this case, HARQ-ACK for a transmission for which the HARQ-ACK (in the DL TX burst) is not available may be ignored or regarded as NACK.

In the configuration above, X and Y may be pre-agreed values or values configured by the BS through higher layer signaling (e.g., RRC signaling) or a dynamic control signal (e.g., downlink control information (DCI)).

In addition, availability of HARQ-ACK may mean that a time corresponding to HARQ-ACK timing after PDSCH scheduling (corresponding to HARQ-ACK) has passed.

(2) First (transmission) SF (or slot) of the latest DL TX burst transmitted (or started to be transmitted) at least N SFs (or slots) before the start time of the DL LBT.

Here, HARQ-ACK for a transmission for which the HARQ-ACK (in the first (transmission) SF (or slot) of the latest DL TX burst) is not available may be ignored or be regarded as NACK.

Here, the value of N may be determined in one of the following ways:

A pre-agreed value or a value configured by the BS. However, when the UE(s) may have a plurality of HARQ-ACK timing values, one of the HARQ-ACK timing values that the UE(s) may have may be N or all the HARQ-ACK timing values that the UE(s) may have may be configured to be less than N;

Minimum value of the HARQ-ACK timings (or processing times for HARQ-ACK transmission) of UEs (provided with a service from the BS) (or a value obtained by quantizing the minimum value on a per SF (or slot) basis);

Maximum value of the minimum processing time values (for HARQ-ACK transmission) of UEs (provided with a service from the BS) (or the minimum HARQ-ACK timing values configured by the BS for the respective UEs based thereon) (or a value obtained by quantizing the maximum value on a per SF (or slot) basis);

Maximum value of the minimum processing time values (for HARQ-ACK transmission) of UEs (scheduled in the DL TX burst) (or the minimum HARQ-ACK timing values configured by the BS for the respective UEs based thereon) (or a value obtained by quantizing the maximum value on a per SF (or slot) basis);

the most frequently configured value among the HARQ-ACK timing values configured for (actually scheduled or all) UEs; and Average of the HARQ-ACK timing values configured for (actually scheduled or all) UEs.

More specifically, the BS configures, as a reference DL resource, the first transmission SF (or slot) of the latest DL TX burst among the DL TX bursts for which at least one HARQ-ACK is available, and assumes that HARQ-ACK information for the transmission in the reference DL resource may be used for the CW size. Here, there may be a case where only HARQ-ACK information for some UEs having short HARQ-ACK timing is available in the HARQ-ACK information for the transmission in the reference DL resource and HARQ-ACK for the other UEs having long HARQ-ACK timing is not available at the time of CW size adjustment of the BS.

In this case, there is no way for the BS to check whether there is a collision with another signal for a UE for which HARQ-ACK is not available. Even when a hidden node is in the vicinity of the UE and a collision actually occurs, the BS fails to reflect the collision in adjustment of the CW size.

Therefore, according to a first reference DL resource configuration method of the present disclosure, the BS may configure, as a reference DL resource, the first (transmission) SF (or slot) in the latest DL TX burst in which all HARQ-ACKs or more than X % of the HARQ-ACKs are available, or all HARQ-ACKs or more than Y % of the HARQ-ACKs in the first (transmission) SF (or slot) are available. Thereafter, the BS may perform CW size adjustment based on the available HARQ-ACKs in the reference DL resource.

Figure 14:
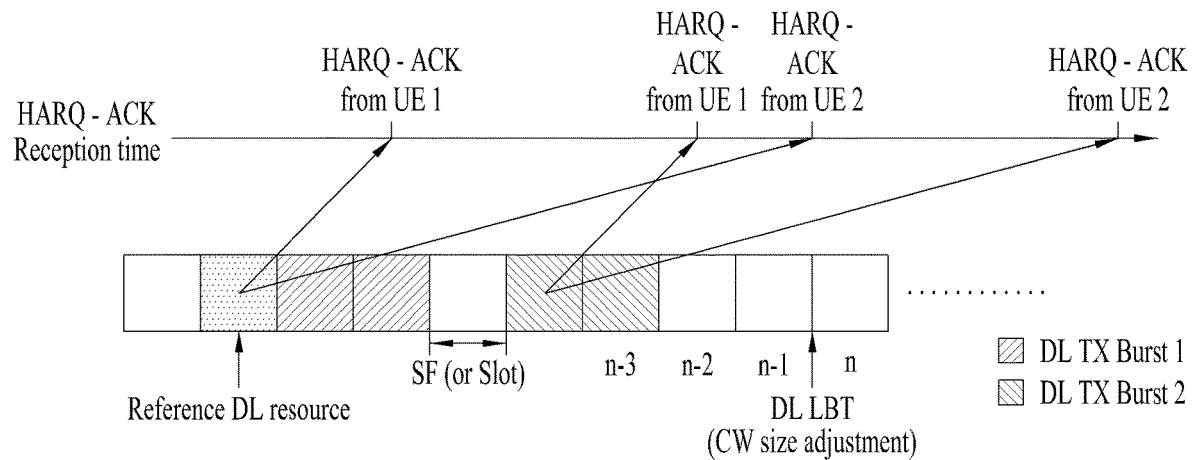
FIG. 14 is a diagram schematically illustrating a case where two UEs, UE1 and UE2, having different HARQ-ACK timings are simultaneously scheduled according to the present disclosure.

FIG. 14 is a diagram schematically illustrating a case where two UEs, UE1 and UE2, having different HARQ-ACK timings are simultaneously scheduled according to the present disclosure.

As shown in FIG. 14, when UE 1 and UE 2 having different HARQ-ACK timings are scheduled at the same time, the first (transmission) SF (or slot) in the latest DL TX burst (e.g., DL TX burst 1) in which all HARQ-ACKs for transmission in the first (transmission) SF (or slot) in the DL TX burst at the n-th SF (or slot), which is a CW size adjustment time, are available may be configured as a reference DL resource. In this case, since some HARQ-ACKs (e.g., HARQ-ACK for UE 2) among the HARQ-ACKs in the first (transmission) SF of DL TX burst 2 are not available at the CW size adjustment time (e.g., the n-th SF (or slot)), the first (transmission) SF of DL TX burst 2 may be excluded from the reference DL resource configuration.

According to a second reference DL resource setting method of the present disclosure, the first (transmission) SF (slot) of the latest DL TX burst transmitted a predetermined time (corresponding to the length of N SFs (or slots)) before a CW size adjustment time may be selected as a reference DL resource. In this case, when the predetermined time (or N) is set to be sufficiently long, it may be expected that most of the HARQ-ACKs for the transmission in the first (transmission) SF (or slot) in the DL TX burst are available (that is, most HARQ-ACKs for the transmission in the first (transmission) SF (or slot) in the DL TX burst are reported before the CW size adjustment time). Therefore, as described above, cases where HARQ-ACK information for a specific UE is omitted for in the CW size adjustment procedure may be reduced.

Here, N may have a pre-agreed value, a value configured by the BS, or a value determined according to HARQ-ACK taming (or UE processing time) configured for the UEs.

For example, when it is assumed in FIG. 14 that the DL LBT time or CW size adjustment time is the n-th SF (or slot), the first (transmission) SF (slot) of a DL TX burst (e.g. DL TX burst 1) that has started transmission N (=7) SFs (or slots) before the aforementioned time may be configured as a reference DL resource. In this case, N may have a value (for example, N=7) obtained by quantizing the maximum value between the HARQ-ACK timings of UE 1 and UE 2 on a per SF (or slot) basis.

In a more generalized case of the configuration, the first (transmission) SF (or slot) of the latest DL TX burst that has started transmission at least $T_0$ ms before the DL LBT start time may be configured as a reference DL resource.

The reference DL resource setting methods described in this section may be applied in combination with other proposed methods of the present disclosure unless they are contradictory or exclusive of each other.

4.1.2. CW Size Adjustment (in DL LBT)

Based on the (available) HARQ-ACK information for transmissions (from multiple UEs) in the reference DL resource (determined according to the aforementioned reference DL resource configuration methods), the BS may perform CW size adjustment as follows.

When Z % or more of the HARQ-ACKs are NACKs, the CW size may be increased. Otherwise, the CW size may be initialized.

Here, HARQ-ACKs actually used for the CW size adjustment among the HARQ-ACKs reported (for the respective UEs) for transmissions (from multiple UEs) in the reference DL resource may be as follows.

In the case where the UE reports HARQ-ACK for each TB:
   (TB-level) HARQ-ACKs for all TB(s) (transmitted) (in the reference DL resource).
In the case where a UE reports HARQ-ACK for a plurality of CBGs:
   Option 1: (CBG-level) HARQ-ACKs for all CBG(s) (transmitted) (in the reference DL resource);
   Option 2: (CBG-level) HARQ-ACKs for the K earliest CBG(s) in the time domain among the CBG(s) (transmitted) (in reference DL resource);
   Option 3: (CBG-level) HARQ-ACKs for K CBG(s) having the lowest CBG indexes among the CBG(s) (transmitted) (in the reference DL resource);
   Option 4: (TB-level) HARQ-ACK for all CBG(s) (transmitted) (in the reference DL resource). Here, as the (TB-level) HARQ-ACK, a value obtained by applying ACK-NACK bundling (e.g., a logical AND operation) to CBG-level HARQ-ACKs in a corresponding TB may be applied.

In the above configurations, (CBG-level) HARQ-ACK for a CBG that is not actually transmitted among the (CBG-level) HARQ-ACKs reported by the UE may not be reflected in CW size adjustment. For example, the term "a CBG that are not actually transmitted" applicable to the present disclosure may correspond to one of the followings.
   a CBG for which (re)transmission is not indicated through (a CBG indication field in) the DL scheduling DCI;
   a CBG for which soft buffer flush is indicated via the DL scheduling DCI; or
   a CBG having (some) resources overlapping with resources indicated as reserved resources or preempted resources through (common) DCI.

In the above-described configuration, Z may have a predetermined value, or a value set by the BS through higher layer signaling (e.g., RRC signaling) or a dynamic control signal (e.g., downlink control information (DCI)).

In addition, K may be less than or equal to the number of CBGs constituting one TB.

Figure 15:
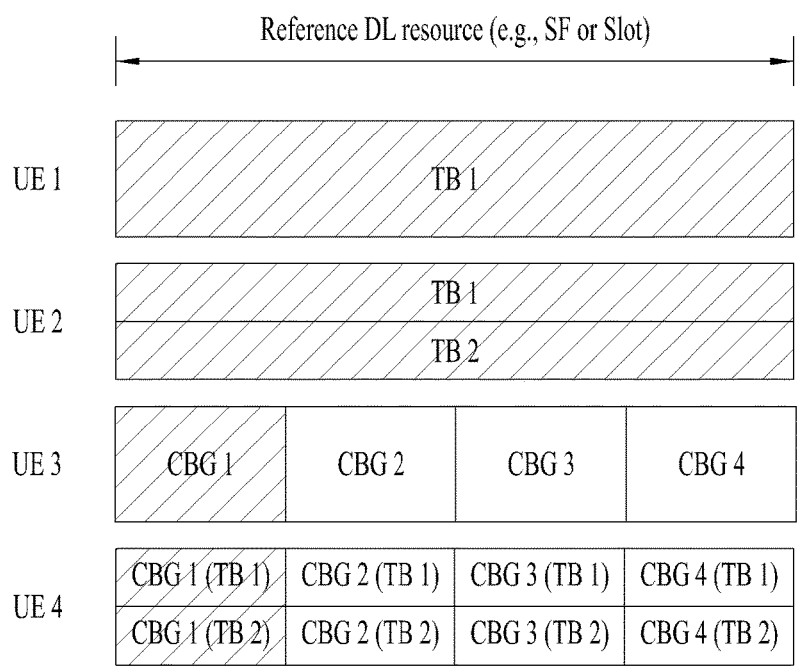
FIG. 15 is a diagram schematically illustrating a TB/CBG configuration for each of a plurality of UEs.

FIG. 15 is a diagram schematically illustrating a TB/CBG configuration for each of a plurality of UEs.

As shown in FIG. 15, it is assumed that there are transmissions for four UEs (e.g., UE 1, UE 2, UE 3, UE 4) in a reference DL resource, UE 1 has transmitted 1 TB, and UE 2 has transmitted 2 TBs, UE 3 has transmitted 4 CBGs (4 CBGs per TB), and UE 4 transmits 8 CBGs (4 CBGs per TB). It is also assumed that UE 1 has reported [NACK] for TB 1, UE 2 has reported [ACK] for TB 1 and [ACK] for TB 2, UE 3 has reported [ACK, NACK, NACK, ACK] for CBGs 1/2/3 in TB 1, and UE 4 has reported [ACK, ACK, NACK, ACK] for CBGs 1/2/3/4 in TB 1 and [NACK, ACK, NACK, ACK] for CBGs 1/2/3/4 in TB 2 before the CW size adjustment time.

In this case, according to the configuration of the LAA of the Rel-13/14 LTE system in which the BS adjusts the CW size for DL LBT based on HARQ-ACK, the BS may assume that there was a collision with another signal if the HARQ-ACK for the earliest transmission of the DL TX burst is NACK, and may assume that there was there was no collision with other signals if the HARQ-ACK is ACK.

Further, according to the above configuration, in performing HARQ-ACK-based CW size adjustment, the BS may utilize only (CBG-level) HARQ-ACKs for the first (transmission) CBG(s) in the reference DL resource for UE 3 and UE 4 that have reported CBG-level HARQ-ACKs. That is, the BS may utilize HARQ-ACK for CBG 1 (in TB 1) for UE 3 and HARQ-ACK for CBG 1 (in TB 1) and CBG 1 (in TB 2) for UE 4 in performing CW size adjustment.

When TB-level HARQ-ACKs are reported as in the case of UE 1 and UE 2, the BS may utilize (TB-level) HARQ-ACKs for all TB(s) (transmitted) (in the reference DL resource) in adjusting the CW size. As an example, it is assumed that the BS increases the CW size if 80% or more of the HARQ-ACKs (in the reference DL resource) are NACKs, and initializes the CW size otherwise. In this case, according to the example of FIG. 15, the total number of HARQ-ACKs is 6 (=1 (UE 1)+2 (UE 2)+1 (UE 3)+2 (UE 4)) and the number of NACKs among the HARQ-ACKs is 2 (=1 (UE 1)+0 (UE 2)+0 (UE 3)+1 (UE 4)). Accordingly, the proportion of the NACKs is less than 80%, and thus the BS may initialize the CW size.

In FIG. 15, the HARQ-ACKs for the hatched portions may be utilized for a CW size.

The method for CW size adjustment (in DL LBT) described in this section may be applied in combination with other proposed methods of the present disclosure unless they are contradictory or exclusive of each other.

4.2. Method for CW Size Adjustment in UL LBT Procedure 4.2.1. Reference UL Resource Configuration In the UL LBT procedure, when the UE refers to retransmission for an HARQ process corresponding to a specific UL transmission resource to perform CW size adjustment, the specific UL transmission resource (which is a reference object regarding whether retransmission for the HARQ process is performed) (hereinafter referred to as a reference UL resource) may be configured as follows.

the first (transmission) SF (or slot) of a UL TX burst including the latest UL transmission SF (or slot) M SFs (or slots) before UL grant reception.

Here, M may be a pre-agreed value or a value configured by the BS through higher layer signaling (e.g., RRC signaling) or a dynamic control signal (e.g., DCI).

More specifically, in the Rel-13/14 LTE system, when the UE receives the UL grant in the n-th SF, the UE configures the first (transmission) SF of a UL TX burst including the latest UL SF before the (n−3)-th SF as a reference SF. If at least one TB is initial transmission for a HARQ process ID corresponding to the reference SF, the UE initializes the CW size. Otherwise, the UE increases the CW size.

In an NR system to which the present disclosure is applicable, the UE may configure the first (transmission) SF of a UL TX burst including the latest UL transmission SF (or slot) M SFs (or slots) before UL grant reception as a reference UL resource, and perform CW size adjustment in UL LBT based on whether retransmission for the HARQ process corresponding to the reference UL resource is to be performed. Here, M may imply the time until the BS obtains a decoding result for the PUSCH after receiving the PUSCH.

In the NR system, the value of M may not be fixed unlike in the LTE system, but may be configured independently for each UE (via a higher layer signaling or DCI) (in consideration of the slot duration and transmission band configured for each UE).

To generalize the above-described configuration, the may configure the first (transmission) SF of a UL TX burst including the latest UL transmission SF (or slot) $T_1$ ms before the UL grant reception as a reference UL resource.

The reference UL resource configuration method described in this section may be applied in combination with other proposed methods of the present disclosure unless they are contradictory or exclusive of each other.

4.2.2. CW Size Adjustment (in UL LBT)

Based on an HARQ process ID (hereinafter, referred to as HARQ ID Ref) for transmission in a reference UL resource (determined according to the aforementioned reference UL resource configuration method), the UE may adjust the CW size as follows.

(1) When the UE performs (UL) (re)transmission on a per TB basis:

Initialize CW if at least one TB having the HARQ ID Ref is for initial transmission; otherwise, increase the CW.

(2) When the UE performs (UL) (re)transmission on a per CBG basis:

Option 1: Initialize CW if at least one CBG having the HARQ ID Ref is initially transmitted; otherwise, increase CW;

Option 2: Initialize CW if at least one CBG of the K earliest CBG(s) in the time domain among the CBG(s) having the HARQ ID Ref (in the reference UL resource) is initially transmitted; otherwise, increase CW;

Option 3: Initialize CW if at least one CBG of the K CBG(s) having the lowest CBG indexes among the CBG(s) having the HARQ ID Ref (in the reference UL resource) is initially transmitted; otherwise, increase CW;

Option 4: Initialize CW if all CBGs for at least one TB among the CBG(s) having the HARQ ID Ref (in the reference UL resource) are initially transmitted; otherwise, increase CW; and Option 5: Initialize CW if at least W % of the CBG(s) having the HARQ ID Ref (in the reference UL resource) are initially transmitted; otherwise, increase CW.

Here, if a TB-level NDI (or a CBG-level NDI) is toggled for a specific TB (or CBG), the UE may consider that the TB (or CBG) has been initially transmitted. If the NDI is not toggled, the UE may consider that the TB (or CBG) has been retransmitted.

In addition, the "otherwise" mentioned above may include the following cases. In these cases, the UE may increase the CWS.

there is no TB (or CBG) transmission corresponding to the HARQ ID Ref (in receiving a UL grant);

retransmission is indicated for (all) TBs or CBGs; and

NACK is indicated for (all) TBs or CBGs;

Here, W may have a predetermined value, or a value set by the BS through higher layer signaling (e.g., RRC signaling) or a dynamic control signal (e.g., DCI).

In addition, K may be less than or equal to the number of CBGs constituting one TB.

Figure 16:
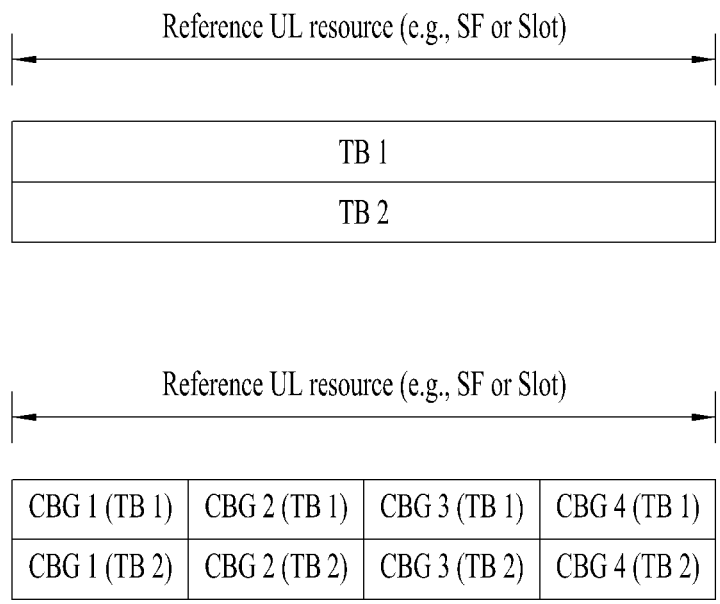
FIG. 16 is a diagram illustrating a reference UL resource configuration applicable to the present disclosure.

FIG. 16 is a diagram illustrating a reference UL resource configuration applicable to the present disclosure.

As shown in the upper part of FIG. 16, in the case where the UE transmits 2 TBs (e.g., TB 1, TB 2) for HARQ process ID Q in the reference UL resource, the UE may initialize the CW if initial transmission is indicated for at least one of TB 1 or TB 2 for HARQ process ID Q in receiving a UL grant. Otherwise, the UE may increase the CW.

Alternatively, as shown in the lower part of FIG. 16, in the case where the UE transmits 8 CBGs (e.g., CBGs 1/2/3/4 for TB 1 and CBGs 1/2/3/4 for TB 2) for HARQ process ID Q in the reference UL resource), the UE may initialize the CW if initial transmission is indicated for at least one of the CBG(s) for HARQ process ID Q. Otherwise, the UE may increase the CW.

Alternatively, if initial transmission of all CBGs for at least one of the TBs for HARQ process ID Q is indicated (that is, if initial transmission of at least one of the TBs is indicated), the UE may initialize the CW. Otherwise, the UE may increase the CW.

The CW size adjustment method (in UL LBT) described in this section may be applied in combination with other proposed methods of the present disclosure unless they are contradictory or exclusive of each other.

4.3. Beam-Common or Beam (Group) Specific CW Size Adjustment

When a transmission node (BS or UE) operates a plurality of TX (analog) beams, the transmission node may adjust the CW size in consideration of beams based on one or more of the following methods in performing DL (or UL) LBT:

(1) Defining a reference DL (or UL) resource irrespective of a TX (analog) beam and performing CW size adjustment based on HARQ-ACK information for transmission in the reference DL (UL) resource (or information about the retransmission status); and (2) Defining a reference DL (or UL) resource for each TX (analog) beam (or TX (analog) Beam group) and performing CW size adjustment based on HARQ-ACK information for transmission in the reference DL (UL) resource (or information about the retransmission status).

Here, when the transmission node is a UE, the BS may configure one of the two CW size adjustment methods described above for the UE.

In addition, when the transmission node is a UE, the BS may indicate a TX (analog) beam group to the UE by RRC signaling or L1/L2 signaling.

As a specific example, it is assumed that Beam #1, Beam #2, Beam #3, and Beam #4 are present as TX (analog) beams from a DL perspective. In this case, the BS may define a reference DL resource for each of the beams (for example, a reference DL resource for a specific beam may be defined according to the reference DL resource configuration method proposed in the present disclosure, among the DL resources transmitted by the beam), and manage the CW size for each beam independently based on HARQ-ACK information in the reference DL resource (e.g., the CW size adjustment method according to section 4.1.2.).

Alternatively, when Beam #1 and Beam #2 are directed in similar directions, the BS may define a beam group-specific reference DL resource based on DL transmission by the beam group (Beam #1, Beam #2), and perform CW size adjustment based on HARQ-ACK information in the reference DL resource.

The above-described operations may be similarly applied to the UE from a UL perspective. In this case, the BS may inform the UE of whether the UE should perform CW size adjustment for each beam or perform beam-common CW size adjustment. In particular, when the UE adjusts the CW size beam group-specifically, the BS may configure information about the beam group for the UE.

The beam-common or beam (group) specific CW size adjustment method described in this section may be applied in combination with other proposed methods of the present disclosure unless they are contradictory or exclusive of each other.

Figure 17:
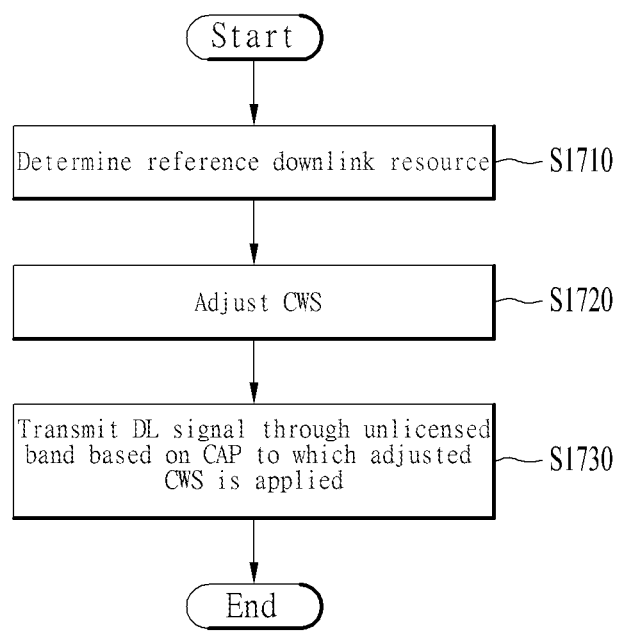
FIG. 17 is a flowchart illustrating a downlink signal transmission method for a base station applicable to the present disclosure.

FIG. 17 is a flowchart illustrating a downlink signal transmission method for a base station applicable to the present disclosure.

The BS determine a first transmission resource of a recent downlink transmission burst satisfying a predetermined condition among one or more downlink transmission bursts transmitted by the BS before a first time, as a reference downlink resource (S1710).

Here, the predetermined condition may correspond to a condition that a proportion of available acknowledgment information for each of one or more UEs for a part or entirety of the downlink transmission burst is greater than or equal to a first value.

In addition, the transmission timing of the acknowledgment information for each of the one or more UEs may be configured independently for each of the UEs.

Subsequently, the BS adjusts a contention window size (CWS) for the reference downlink resource based on the acknowledgment information received from the one or more UEs by the first time (S1720).

Subsequently, the BS performs downlink signal transmission through the unlicensed band based on a channel access procedure (CAP) to which the adjusted CWS is applied (S1730).

Here, the first value may be preconfigured by the BS.

Here, the available acknowledgment information may refer to acknowledgment information that allows the BS to recognize that the received acknowledgment information is ACK or NACK. For example, the available acknowledgment information may correspond to acknowledgment information whose acknowledgment information transmission timing is earlier than the first time. Alternatively, even when one or more UEs transmit the acknowledgment information before the first time, the BS may fail to recognize that the received acknowledgment information is ACK or NACK for implementation related reasons (e.g., decoding time). Thus, the available acknowledgment information may correspond to acknowledgment information that the BS may receive before the first time and recognize as ACK or NACK.

According to a more specific example, when the predetermined condition corresponds to a condition that the proportion of the acknowledgment information for each of the one or more UEs for a part of the downlink transmission bursts that have acknowledgment information transmission timing before the first time is greater than or equal to a first value, the part of the downlink transmission burst may correspond to the first transmission resource of the downlink transmission burst.

In addition, when the proportion of non-acknowledgement (NACK) in the acknowledgment information received from the one or more UEs for the reference downlink resource by the first time is greater than or equal to a second value, the CWS may be increased. Alternatively, when the proportion of NACK in the acknowledgment information received from the one or more UEs for the reference downlink resource by the first time is less than the second value, the CWS may be initialized. Here, the second value may be configured according to a supporting system or a supporting standard technology.

Here, the acknowledgment information may include transmission block (TB) level or code block group (CBG) level acknowledgment information.

For example, when the acknowledgment information includes CBG level acknowledgment information, the proportion of NACK in the acknowledgment information received from the one or more UE for the reference downlink resource by the first time may be calculated in consideration of acknowledgment information for all CBGs included in the CBG level acknowledgment information.

Alternatively, when the acknowledgment information includes CBG level acknowledgment information, the proportion of NACK in the acknowledgment information received from the one or more UE for the reference downlink resource by the first time may be calculated considering only acknowledgment information for some CBGs included in the CBG level acknowledgment information.

In this case, the acknowledgment information for the some CBGs is acknowledgment information for some CBGs determined among the CBGs transmitted in the reference downlink resource, based on a transmission time order or a CBG index order.

When the BS transmits a signal using a plurality of transmission beams, the reference downlink resource may be determined for each beam.

As examples of the proposed scheme described above may be included as one of the implementation methods of the present disclosure, it is apparent that they may be regarded as a kind of proposed schemes. In addition, the above-described proposed schemes may be independently implemented, or some proposed schemes may be implemented in a combined (or merged) manner. A rule may be defined such that information about whether the proposed methods are applied (or information on the rules of the proposed methods) is delivered from the BS to the UE by a predefined signal (e.g., a physical layer signal or a higher layer signal).

5. Device Configuration

Figure 18:
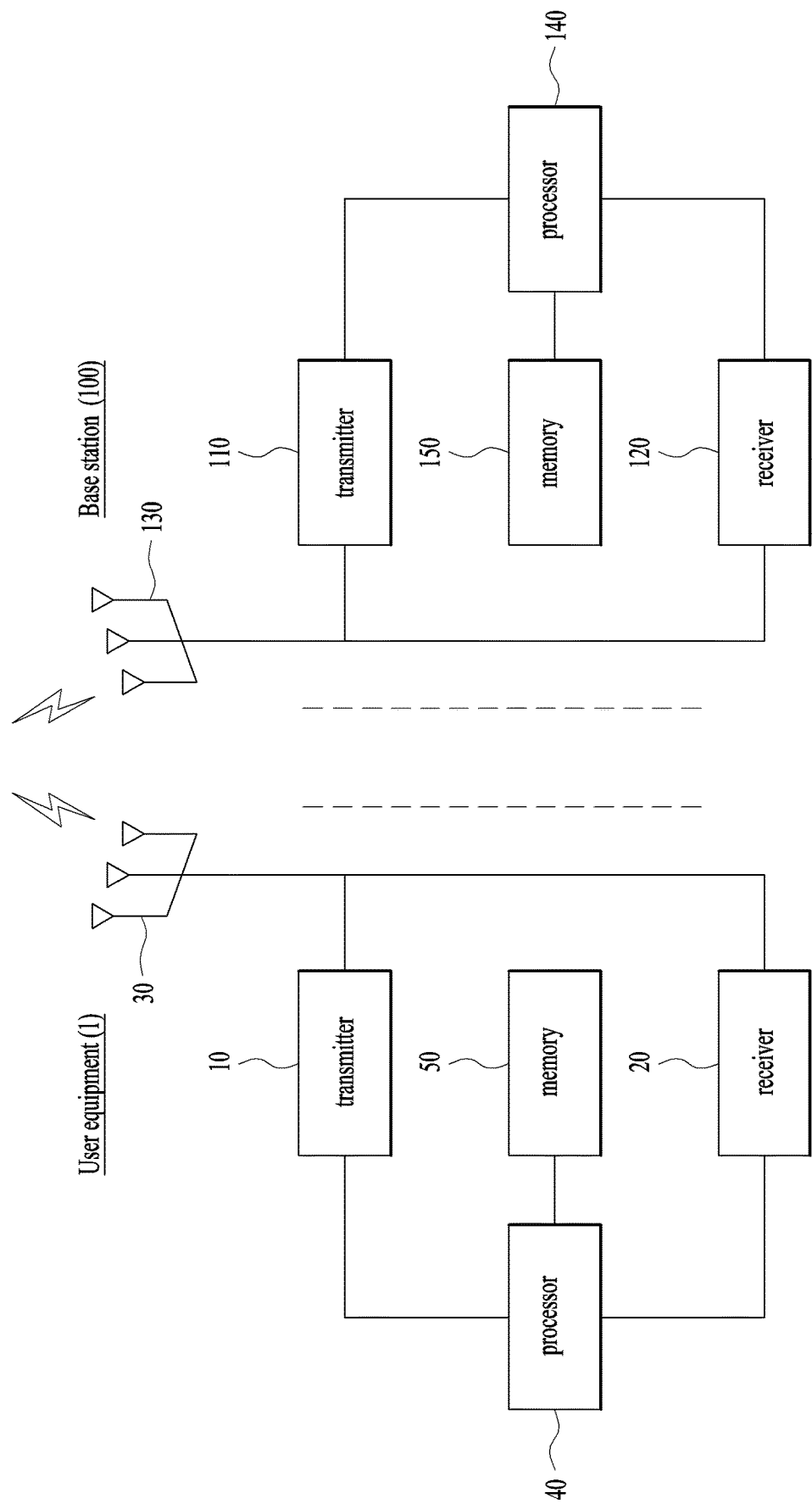
FIG. 18 illustrates a base station and a user equipment applicable to an example of the present disclosure.

FIG. 18 illustrates a configuration of a user equipment and a base station by which the proposed examples may be implemented. The user equipment and the base station illustrated in FIG. 18 operate to implement the examples of the method for transmitting and receiving downlink signals between the UE and the BS described above.

The user equipment (UE) 1 may operate as a transmitter on uplink and as a receiver on downlink. In addition, the base station (eNB or gNB) 100 may operate as a receiver on uplink and as a transmitter on downlink.

That is, the UE and the base station may each include a transmitter 10, 110 and a receiver 20, 120 to control transmission and reception of information, data, and/or messages, and may also include an antenna 30, 130 configured to transmit and receive information, data, and/or messages.

In addition, the UE and the base station may each include a processor 40, 140) configured to carry out the above-described examples of the present disclosure and a memory 50, 150 capable of temporarily or persistently store a processing procedure of the processor.

Using the processor 140, the base station 100 configured as described above determines the first transmission resource of the latest downlink transmission burst satisfying a predetermined condition among one or more downlink transmission bursts transmitted by the base station before a first time as a reference downlink resource. Here, the predetermined condition may correspond to a condition that a proportion of available acknowledgment information for each of one or more UEs for a part or the entirety of the downlink transmission burst is greater than or equal to a first value, and the transmission timing of the acknowledgment information for each of the one or more UEs may be configured independently for each UE.

Using the processor 140, the base station 100 adjusts a contention window size (CWS) for the reference downlink resource based on the acknowledgment information received from the one or more UEs by the first time. In addition, using the transmitter 110, the base station 100 performs downlink signal transmission through the unlicensed band based on a channel access procedure (CAP) to which the adjusted CWS is applied.

The transmitter and receiver of each of the UE and BS may perform packet modulation/demodulation for data transmission, high-speed packet channel coding, OFDMA packet scheduling, TDD packet scheduling, and/or channel multiplexing. Each of the UE and BS of FIG. 17 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

The embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:
1. A method for transmitting, by a user equipment (UE), an uplink signal to a base station (BS) in a wireless communication system supporting an unlicensed band, the method comprising:
    transmitting, to the BS, a first data in a reference resource configured for adjusting a contention window size (CWS), wherein the transmission of the first data is a transport block (TB) based transmission or code block group (CBG) based transmission;
    receiving, from the BS, an acknowledgement information for the first data, wherein the acknowledgement information comprises information for indicating initial transmission or retransmission;
    adjusting a contention window size (CWS) differently based on whether the transmission of the first data is the TB based transmission or the CBG based transmission; and
    transmitting, to the BS, a second data based on a channel access procedure (CAP) to which the adjusted CWS is applied.
2. The method according to claim 1,
    wherein, for a case of the CBG based transmission, the CWS is adjusted based on a ratio of the acknowledgement information for indicating the initial transmission, and wherein, for a case of the TB based transmission, the CWS is adjusted based on a number of the information for indicating the initial transmission.

3. The method according to claim 2,
wherein, for the case of the CBG based transmission,
based on the ratio of the acknowledgment information for indicating the initial transmission greater than or equal to a threshold value, the CWS is initialized, and
wherein, based on the ratio of the acknowledgment information for indicating the initial transmission less than the threshold value, the CWS is increased.

4. The method according to claim 2,
wherein the acknowledgment information comprises TB level or CBG level acknowledgment information.

5. The method according to claim 1,
wherein the acknowledgement information comprises a bit value included in a downlink control information (DCI).

6. The method according to claim 5,
wherein the initial transmission or the retransmission is indicated by toggling the bit value included in the DCI.

7. The method according to claim 1,
wherein the reference resource is configured based on an uplink transmission burst including the latest uplink resource transmitted before a predefined number of uplink resource from reception of an uplink grant, and the uplink resource includes a subframe or a slot.

8. The method according to claim 1,
wherein, based on transmitting, by the UE, a signal based on a plurality of transmission beams, the reference resource is determined for each of the beams.

9. A user equipment (UE) for transmitting an uplink signal to a base station (BS) in a wireless communication system supporting an unlicensed band, the UE comprising:
a receiver;
a transmitter; and
a processor operatively connected with the receiver and the transmitter,
wherein the processor is configured to:
transmit, to the BS, a first data in a reference resource configured for adjusting a contention window size (CWS), wherein the transmission of the first data is a transport block (TB) based transmission or code block group (CBG) based transmission;
receive, from the BS, an acknowledgement information for the first data, wherein the acknowledgement information comprises information for indicating initial transmission or retransmission;
adjust a contention window size (CWS) differently based on whether the transmission of the first data is the TB based transmission or the CBG based transmission; and
transmit, to the BS, a second data through the unlicensed band based on a channel access procedure (CAP) to which the adjusted CWS is applied.

10. The UE according to claim 9,
wherein, for a case of the CBG based transmission, the CWS is adjusted based on a ratio of the acknowledgement information for indicating the initial transmission, and
wherein, for a case of the TB based transmission, the CWS is adjusted based on a number of the information for indicating the initial transmission.

11. The UE according to claim 10,
wherein, for the case of the CBG based transmission,
based on the ratio of the acknowledgment information for indicating the initial transmission greater than or equal to a threshold value, the CWS is initialized, and
wherein, based on the ratio of the acknowledgment information for indicating the initial transmission less than the threshold value, the CWS is increased.

12. The UE according to claim 9,
wherein the acknowledgement information comprises a bit value included in a downlink control information (DCI).

13. The UE according to claim 12,
wherein the initial transmission or the retransmission is indicated by toggling the bit value included in the DCI.

* * * * *